(12) United States Patent
He

(10) Patent No.: US 11,405,618 B2
(45) Date of Patent: *Aug. 2, 2022

(54) USING MULTIPLE MODELS FOR ENTROPY CODING IN VIDEO COMPRESSION

(71) Applicant: GOOGLE LLC, Mountain View, CA (US)

(72) Inventor: Dake He, Sunnyvale, CA (US)

(73) Assignee: GOOGLE LLC, Mountain View, CA (US)

(*) Notice: Subject to any disclaimer, the term of this patent is extended or adjusted under 35 U.S.C. 154(b) by 43 days.

This patent is subject to a terminal disclaimer.

(21) Appl. No.: 17/136,200

(22) Filed: Dec. 29, 2020

(65) Prior Publication Data

US 2021/0120249 A1 Apr. 22, 2021

Related U.S. Application Data

(63) Continuation of application No. 16/835,379, filed on Mar. 31, 2020, now Pat. No. 10,887,595, which is a
(Continued)

(51) Int. Cl.
*H04N 19/13* (2014.01)
*H04N 19/91* (2014.01)
(Continued)

(52) U.S. Cl.
CPC .......... *H04N 19/13* (2014.11); *H04N 19/124* (2014.11); *H04N 19/159* (2014.11);
(Continued)

(58) Field of Classification Search
CPC .... H04N 19/13; H04N 19/124; H04N 19/159; H04N 19/176; H04N 19/18; H04N 19/196; H04N 19/91; H04N 19/96; H04N 19/129
See application file for complete search history.

(56) References Cited

U.S. PATENT DOCUMENTS

| 7,233,269 B1 * | 6/2007 | Chen ................. H03M 7/30 |
| | | 375/E7.2 |
| 2005/0169374 A1 * | 8/2005 | Marpe .................. H04N 19/16 |
| | | 375/240.18 |

(Continued)

FOREIGN PATENT DOCUMENTS

| DE | 69732873 T2 * | 3/2006 | ............ G06T 9/005 |
| EP | 2945383 A1 * | 11/2015 | ........... H04N 19/124 |

(Continued)

*Primary Examiner* — Dramos Kalapodas
(74) *Attorney, Agent, or Firm* — Young Basile Hanlon & MacFarlane, P.C.

(57) ABSTRACT

An apparatus for entropy coding a sequence of bits obtains, using a first probability distribution, a first conditional probability for coding a bit at a position within the sequence of bits, the first conditional probability being a conditional probability of the bit having a certain value given that a sub-sequence of the sequence of bits has first respective values; obtains, using a second probability distribution that is different from the first probability distribution, a second conditional probability for coding the bit, the second conditional probability being a conditional probability of the bit having the certain value given that the sub-sequence has second respective values; obtains, using the first conditional probability and the second conditional probability, a mixed probability for coding the bit; and codes the bit using the mixed probability.

18 Claims, 13 Drawing Sheets

Related U.S. Application Data continuation of application No. 16/562,659, filed on Sep. 6, 2019, now Pat. No. 10,645,389, which is a continuation of application No. 15/824,058, filed on Nov. 28, 2017, now Pat. No. 10,448,019.

(60) Provisional application No. 62/551,341, filed on Aug. 29, 2017.

(51) Int. Cl.

| | |
|---|---|
| *H04N 19/18* | (2014.01) |
| *H04N 19/159* | (2014.01) |
| *H04N 19/196* | (2014.01) |
| *H04N 19/124* | (2014.01) |
| *H04N 19/176* | (2014.01) |
| *H04N 19/96* | (2014.01) |
| *H04N 19/129* | (2014.01) |

(52) U.S. Cl.
CPC ........... *H04N 19/176* (2014.11); *H04N 19/18* (2014.11); *H04N 19/196* (2014.11); *H04N 19/91* (2014.11); *H04N 19/96* (2014.11); *H04N 19/129* (2014.11)

(56) References Cited

U.S. PATENT DOCUMENTS

| | | | |
|---|---|---|---|
| 2007/0230811 A1* | 10/2007 | Lee | H04N 19/103 382/254 |
| 2008/0080620 A1* | 4/2008 | Lee | H04N 19/61 375/E7.186 |
| 2012/0170857 A1* | 7/2012 | He | H04N 19/91 382/233 |
| 2019/0068994 A1* | 2/2019 | He | H04N 19/18 |

FOREIGN PATENT DOCUMENTS

| | | | |
|---|---|---|---|
| JP | 2015204556 A | * 11/2015 | |
| WO | WO-2011100837 A1 | * 8/2011 | .............. H03M 7/40 |

\* cited by examiner

USING MULTIPLE MODELS FOR ENTROPY CODING IN VIDEO COMPRESSION

CROSS-REFERENCE TO RELATED APPLICATION(S)

This application is a continuation of U.S. application patent Ser. No. 16/835,379, filed Mar. 31, 2020, which is a continuation of U.S. application patent Ser. No. 16/562,659, filed Sep. 6, 2019, which is a continuation of U.S. application patent Ser. No. 15/824,058, filed Nov. 28, 2017, which claims priority to and the benefit of U.S. Provisional Application Patent Ser. No. 62/551,341, filed Aug. 29, 2017, the entire disclosures of which are hereby incorporated by reference.

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including compression and other encoding techniques.

Encoding based on motion estimation and compensation may be performed by breaking frames or images into blocks that are predicted based on one or more prediction blocks of reference frames. Differences (i.e., residual errors) between blocks and prediction blocks are compressed and encoded in a bitstream. A decoder uses the differences and the reference frames to reconstruct the frames or images.

SUMMARY

A first aspect of the disclosed implementations is an apparatus for entropy coding a sequence of bits. The apparatus obtains, using a first probability distribution, a first conditional probability for coding a bit at a position within the sequence of bits, the first conditional probability being a conditional probability of the bit having a certain value given that a sub-sequence of the sequence of bits has first respective values; obtains, using a second probability distribution that is different from the first probability distribution, a second conditional probability for coding the bit, the second conditional probability being a conditional probability of the bit having the certain value given that the sub-sequence has second respective values; obtains, using the first conditional probability and the second conditional probability, a mixed probability for coding the bit; and codes the bit using the mixed probability.

A second aspect of the disclosed implementations is a method for entropy coding a quantized transform block. The method includes selecting probability distributions including a first probability distribution and a second probability distribution for coding a token indicative of a quantized transform coefficient of the quantized transform block; approximating, using the first probability distribution, a first conditional probability for coding the token, the first conditional probability being a conditional probability of the token given previously coded tokens for the quantized transform block; approximating, using the second probability distribution, a second conditional probability for coding the token, the second conditional probability being a conditional probability of the token given the previously coded tokens for the quantized transform block; determining a mixed probability using the first conditional probability and the second conditional probability; and coding the token using the mixed probability.

A third aspect of the disclosed implementations is an apparatus for entropy decoding a sequence of symbols. The apparatus includes a processor that is configured to select models comprising a first model and a second model for decoding a sequence of bits $x^n$, where the sequence of bits $x^n$ includes bits $x_i$ for each i=0 to n−1; and for each bit $x_j$ at a position j of the sequence of bits $x^n$, the processor is configured to: determine a first conditional probability $p_1(x_j|x^{j-1})$ using the first model; determine a second conditional probability $p_2(x_j|x^{j-1})$ using the second model; obtain a mixed probability $\tilde{p}(x_j|x^{j-1})$ using the first conditional probability and the second conditional probability; and decode the bit $x_j$ using the mixed probability.

These and other aspects of the present disclosure are disclosed in the following detailed description of the embodiments, the appended claims, and the accompanying figures.

BRIEF DESCRIPTION OF THE DRAWINGS

The description herein refers to the accompanying drawings wherein like reference numerals refer to like parts throughout the several views.

DETAILED DESCRIPTION

Figure 1:
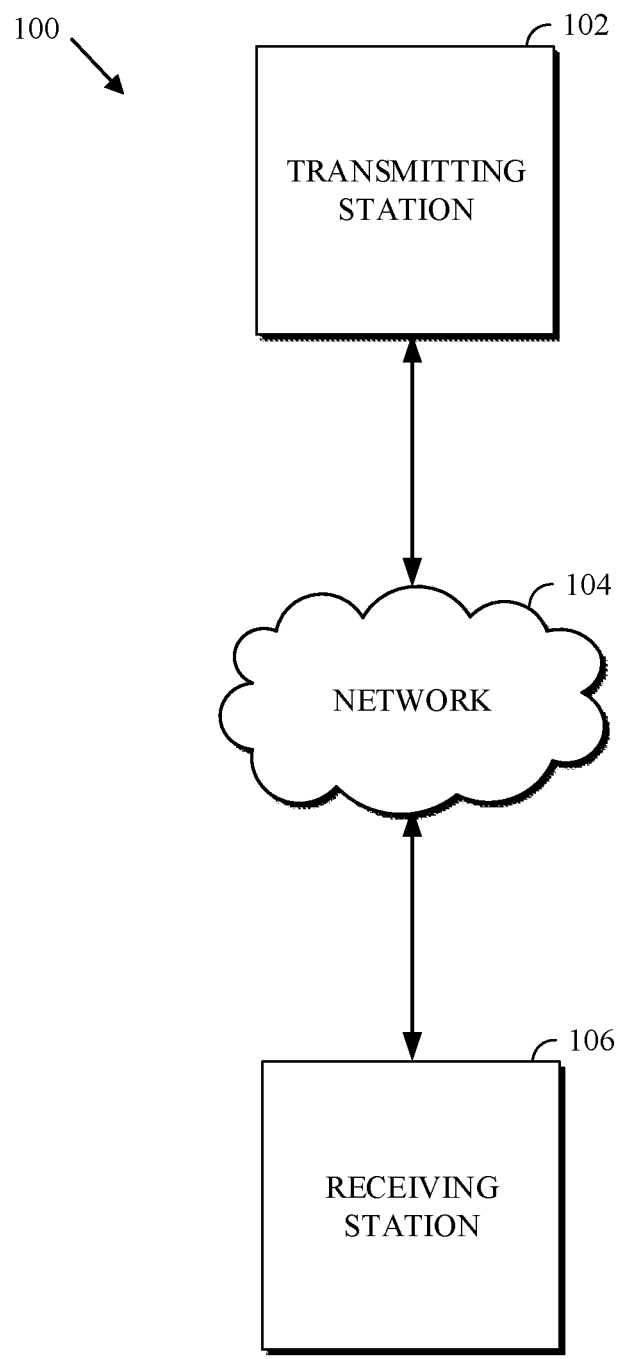
FIG. 1 is a schematic of a video encoding and decoding system.

As mentioned above, compression schemes related to coding video streams may include breaking images into blocks and generating a digital video output bitstream using one or more techniques to limit the information included in the output. A received encoded bitstream can be decoded to re-create the blocks and the source images from the limited information. Encoding a video stream, or a portion thereof, such as a frame or a block, can include using temporal or spatial similarities in the video stream to improve coding efficiency. For example, a current block of a video stream may be encoded based on identifying a difference (residual) between the previously coded pixel values and those in the current block. In this way, only the residual and parameters used to generate the residual need be added to the encoded bitstream. The residual may be encoded using a lossy quantization step.

As further described below, the residual block can be in the pixel domain. The residual block can be transformed into the frequency domain resulting in a transform block of transform coefficients. The transform coefficients can be quantized resulting into a quantized transform block of quantized transform coefficients. The quantized coefficients can be entropy encoded and added to an encoded bitstream. A decoder can receive the encoded bitstream, entropy decode the quantized transform coefficients to reconstruct the original video frame.

Entropy coding is a technique for "lossless" coding that relies upon probability models that model the distribution of values occurring in an encoded video bitstream. By using probability models based on a measured or estimated distribution of values, entropy coding can reduce the number of bits required to represent video data close to a theoretical minimum. In practice, the actual reduction in the number of bits required to represent video data can be a function of the accuracy of the probability model, the number of bits over which the coding is performed, and the computational accuracy of fixed-point arithmetic used to perform the coding.

In an encoded video bitstream, many of the bits are used for one of two things: either content prediction (e.g., inter mode/motion vector coding, intra prediction mode coding, etc.) or residual coding (e.g., transform coefficients). Encoders may use techniques to decrease the amount of bits spent on coefficient coding. For example, a coefficient token tree (which may also be referred to as a binary token tree) specifies the scope of the value, with forward-adaptive probabilities for each branch in this token tree. The token base value is subtracted from the value to be coded to form a residual then the block is coded with fixed probabilities. A similar scheme with minor variations including backward-adaptivity is also possible. Adaptive techniques can alter the probability models as the video stream is being encoded to adapt to changing characteristics of the data. In any event, a decoder is informed of (or has available) the probability model used to encode an entropy-coded video bitstream in order to decode the video bitstream.

As described above, entropy coding a sequence of symbols is typically achieved by using a probability model to determine a probability p for the sequence and then using binary arithmetic coding to map the sequence to a binary codeword at the encoder and to decode that sequence from the binary codeword at the decoder. The length (i.e., number of bits) of the codeword is given by $-\log_2(p)$. The efficiency of entropy coding can be directly related to the probability model.

Given a probability $p(x^n)$ of a sequence of symbols $x^n$, a good entropy coding engine, such as a well-designed binary arithmetic coding engine, can produce from the probability $p(x^n)$ a binary string of length $-\log_2(p(x^n))$. As the length of the string is an integer number, "a binary string of length $-\log_2(p(x^n))$" means a binary string having a length that is the smallest integer that is greater than $-\log_2(p(x^n))$. Herein, when referring to a sequence of symbols, a superscript of i refers to a sequence having a length of i symbols, and a subscript of i refers to the symbol at position i in the sequence. For example, $x^5$ refers to a sequence of five (5) symbols, such as 11010; whereas $x_5$ refers to the symbol in the $5^{th}$ position, such as the last 0 in the sequence 11010. As such the sequence $x^n$ can be expressed as $x^n = x_1 x_2 \cdots x_n$.

In some implementations, a symbol can refer to a token that is selected from a non-binary token alphabet that includes N tokens. As such, the symbol (i.e., token) can have one of N values. The token can be a token that is used to code, and is indicative of, a transform coefficient. In such cases, "a sequence of symbols $x^n$" refers to the list of tokens $x_1, x_2, \ldots, x_n$ used to code the transform coefficients at scan positions $1, 2, \ldots, n$, respectively, in a scan order.

As used herein, probability values, such as the probability $p(x^i)$ of the sub-sequence $x^i$, can have either floating-point or fixed-point representations. Accordingly, operations applied to these values may use either floating-point arithmetic or fixed-point arithmetic.

Given two probabilities $p_1(x^n)$ and $p_2(x^n)$ such that $p_1(x^n) < p_2(x^n)$, the probability $p_1(x^n)$ results in a codeword that is no shorter than the probability $p_2(x^n)$. That is, a smaller probability typically produces a longer codeword than a larger probability.

The underlying probability model from which symbols are emitted in video coding is typically unknown and/or is likely too complex to be fully described. As such, designing a good model for use in entropy coding can be a challenging problem in video coding. For example, a model that works well for one sequence may perform poorly for another sequence. That is, given a first model and a second model, some sequences might compress better using the first model while other sequences might compress better using the second model.

In some video systems, it is possible to code (i.e., signal in an encoded bitstream) an optimal model for encoding a sequence. For example, given a sequence to be encoded, a video system may encode the sequence according to all or a subset of available models and then select the model that results in the best compression result. That is, it is possible to code the selection of a particular model among a set of more than one models for the sequence. In such a system, a two-pass process may be, implicitly or explicitly, performed: a first pass to determine the optimal model and a second to encode using the optimal model. A two-pass process may not be feasible in, e.g., real-time applications and other delay-sensitive applications.

As mentioned above, multiple models (i.e., models $1, \ldots, M$) may be available for entropy coding. For a sequence of symbols to be compressed without loss of information, mixing a finite number of models for arithmetic coding can be as good selecting the best one model, asymptotically. This follows from the fact that the log (i.e., logarithm) function is a concave function and that the $-\log$ function is a convex function.

From the foregoing, and for a finite sequence $x^n = x_1 x_2 \cdots x_n$ of length n, inequality (1) follows:

$$-\log(\Sigma_{k=1}^{M} w_k p_k(x^n)) \leq \Sigma_{k=1}^{M} w_k(-\log p_k(x^n)) \quad (1)$$

In the inequality (1), $w_k$ denotes a weighting factor of the $k^{th}$ model and $p_k(x^n)$ denotes the joint probability of $x^n$ given by model k. As described above, given a probability $p_k(x^n)$ (i.e., the probability given by model k of the sequence $x^n$) and $x^n$ as the input, an entropy coding engine can map $x^n$ into a binary codeword of length that is approximately equal to $-\log p_k(x^n)$.

From the inequality (1), it follows that taking the linear (i.e., weighted) sum of the probabilities (i.e., $\Sigma_{k=1}^{M} w_k p_k(x^n)$) for the available models and then taking the logarithm of the linear sum is always less than or equal to taking the logarithms of the probabilities ($\log p_k(x^n)$) of the models 1, . . . , M and then performing a linear sum using the same weighting factors $\{w_k\}$. That is, the left-hand-side of the inequality (1) is always less than or equal to the right-hand-side of the inequality.

It also follows from the inequality (1) that, given M models, it is more advantageous to mix the probabilities of the models 1, . . . , M before entropy coding a symbol. That is, it may be more advantageous to mix the probabilities of multiple models before entropy coding than to choose models according to probabilities and using each model to individually code a sequence of bits. Mixing distinct models is likely to improve compression performance (i.e. reduces compression rate) and is no worse than selecting and coding the best model and then to code a sequence using the selected model.

The probability $p_k(x^n)$ is a joint probability of the sequence $x^n$. That is, given the sequence $x^n = x_1 x_2 \bullet \bullet \bullet x_n$, the joint probability $p_k(x^n)$ is the probability that the first symbol is $x_1$, the second symbol is $x_2$, . . . , and the $n^{th}$ symbol is $x_n$. As coding $x^n$ jointly can incur significant delay in processing and can incur a high computational complexity, mixing has found limited use, if at all, in video coding.

A model, as used herein, can be, or can be a parameter in, a lossless (entropy) coding. A model can be any parameter or method that affects probability estimation for the purpose of entropy coding. For example, a model can define the probability to be used to encode and decode the decision at an internal node in a token tree (such as described with respect to FIG. 7 below). In such a case, the two-pass process to learn the probabilities for a current frame may be simplified to a single-pass process by mixing multiple models as described herein. In another example, a model may define a certain context derivation method. In such a case, implementations according to this disclosure can be used to mix coding probabilities generated by a multitude of such methods. In yet another example, a model may define a completely new lossless coding algorithm.

Implementations according to this disclosure can efficiently mix multiple models for entropy coding in real-time or delay sensitive applications, including video coding, to reduce the number of bits required to represent video data. Mixing models can be used for encoding any value that is coded using entropy coding. For example, two or more probability models can be mixed in order to entropy code quantized transform coefficients. The benefits of implementations according to this disclosure include 1) improved compression performance and 2) the mixing of probabilities from multiple models in a single-pass coding process that does not sacrifice compression performance or incur a high computational cost.

Mixing for entropy coding in video compression is described herein first with reference to a system in which the teachings may be incorporated.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
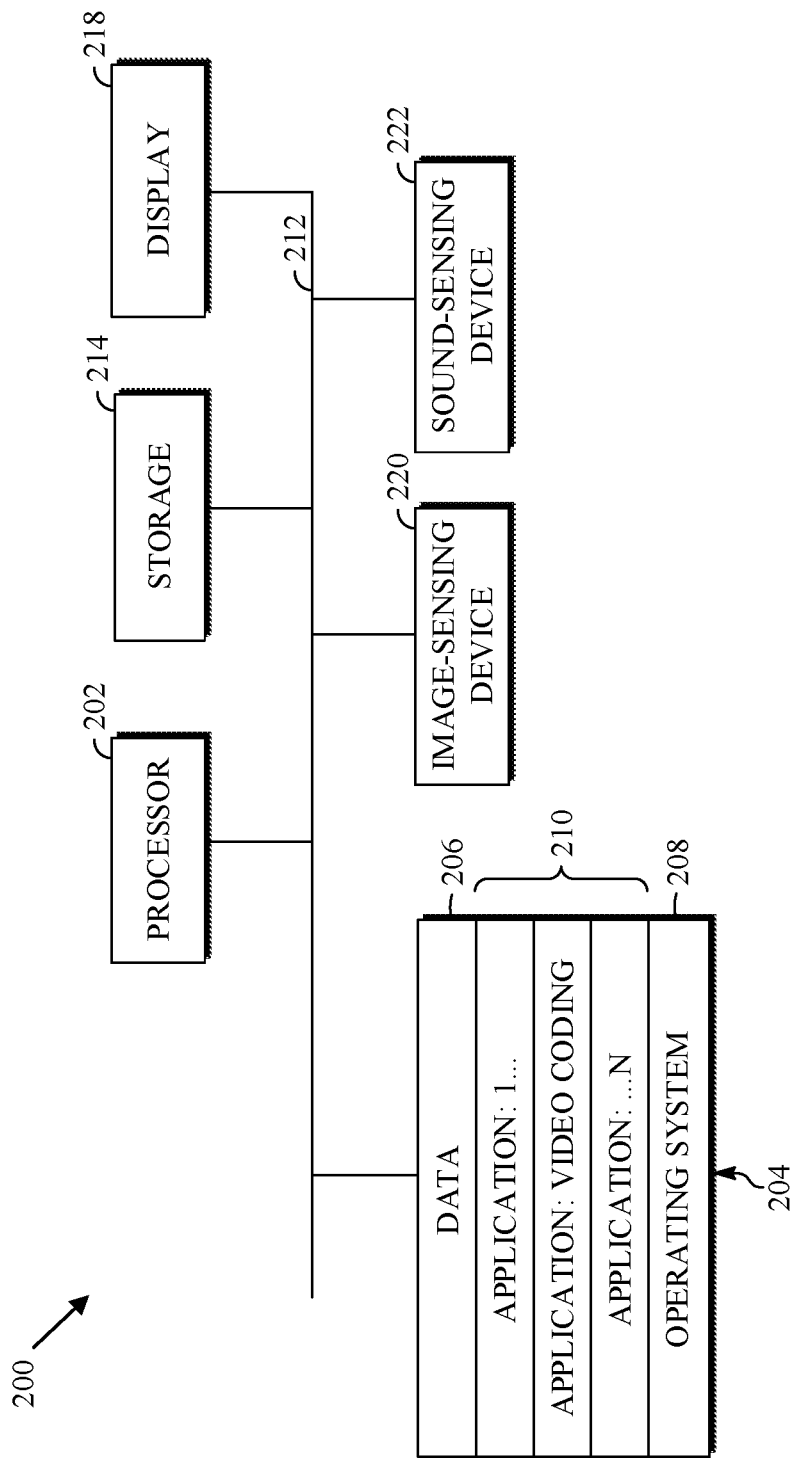
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission, at a later time, to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., an HTTP-based video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of a single computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, capable of manipulating or processing information now existing or hereafter developed. Although the disclosed implementations can be practiced with a single processor as shown, e.g., the CPU 202, advantages in speed and efficiency can be achieved using more than one processor.

A memory 204 in the computing device 200 can be a read-only memory (ROM) device or a random access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. The computing device 200 can also include a secondary storage 214, which can, for example, be a memory card used with a computing device 200 that is mobile. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example, a camera or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more of processors) that can be coupled directly or across a local area or other network. The memory 204 can be distributed across multiple machines such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit such as a memory card or multiple units such as multiple memory cards. The computing device 200 can thus be implemented in a wide variety of configurations.

Figure 3:
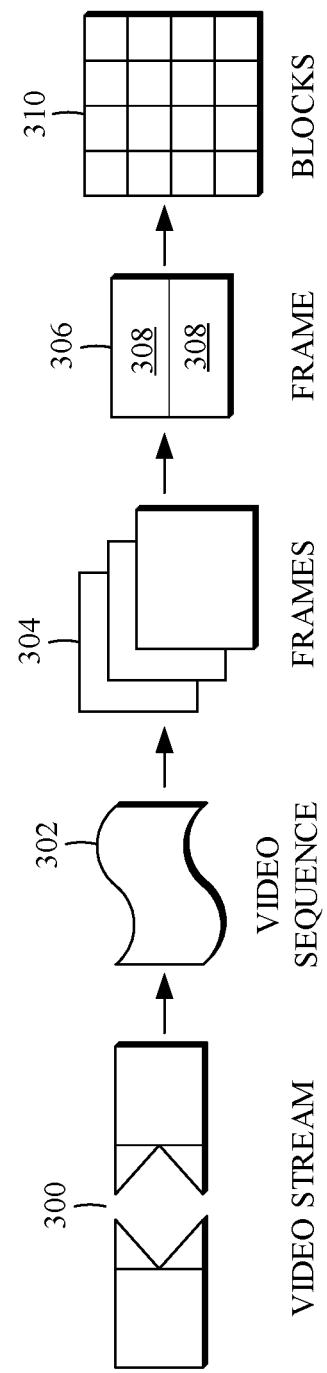
FIG. 3 is a diagram of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of segments 308 or planes. The segments 308 can be subsets of frames that permit parallel processing, for example. The segments 308 can also be subsets of frames that can separate the video data into separate colors. For example, the frame 306 of color video data can include a luminance plane and two chrominance planes. The segments 308 may be sampled at different resolutions.

Whether or not the frame 306 is divided into the segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels or larger.

Figure 4:
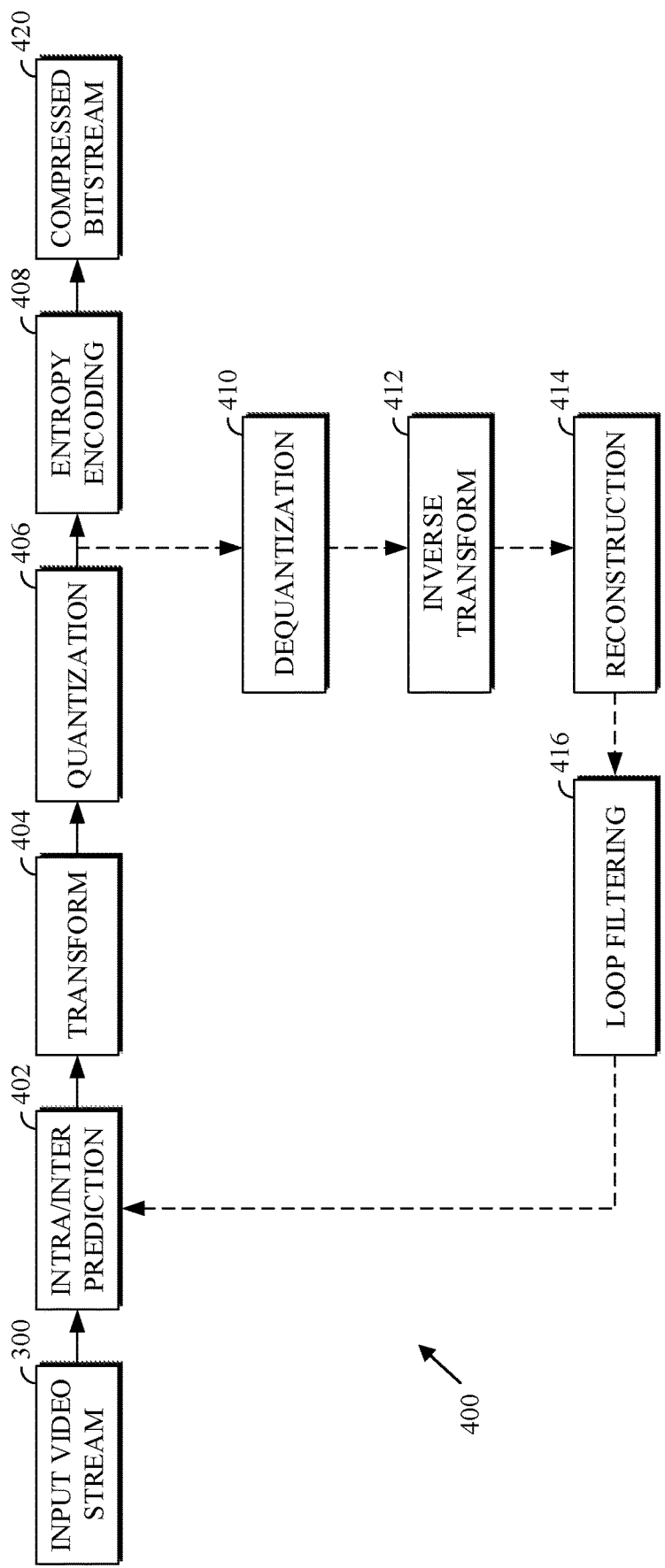
FIG. 4 is a block diagram of an encoder according to implementations of this disclosure.

FIG. 4 is a block diagram of an encoder 400 in accordance with implementations of this disclosure. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in the manner described herein. The encoder 400 can also be implemented as specialized hardware included in, for example, the transmitting station 102. The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, the frame 306 can be processed in units of blocks. At the intra/inter prediction stage 402, a block can be encoded using intra-frame prediction (also called intra-prediction) or inter-frame prediction (also called inter-prediction), or a combination of both. In any case, a prediction block can be formed. In the case of intra-prediction, all or a part of a prediction block may be formed from samples in the current frame that have been previously encoded and reconstructed. In the case of inter-prediction, all or part of a prediction block may be formed from samples in one or more previously constructed reference frames determined using motion vectors.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. Such block-based transforms include, for example, the Discrete Cosine Transform (DCT) and the Asymmetric Discrete Sine Transform (ADST). Other block-based transforms are possible. Further, combinations of different transforms may be applied to a single residual. In one example of application of a transform, the DCT transforms the residual block into the frequency domain where the transform coefficient values are based on spatial frequency. The lowest frequency (DC) coefficient at the top-left of the matrix and the highest frequency coefficient at the bottom-right of the matrix. It is worth noting that the size of a prediction block, and hence the resulting residual block, may be different from the size of the transform block. For example, the prediction block may be split into smaller blocks to which separate transforms are applied.

The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. Entropy coding may be performed using any number of techniques, including token and binary trees. The entropy-encoded coefficients, together with other information used to decode the block, which may include for example the type of prediction used, transform type, motion vectors and quantizer value, are then output to the compressed bitstream 420. The information to decode the block may be entropy coded into block, frame, slice and/or section headers within the compressed bitstream 420. The compressed bitstream 420 can also be referred to as an encoded video stream or an encoded video bitstream, and the terms will be used interchangeably herein.

The reconstruction path in FIG. 4 (shown by the dotted connection lines) can be used to ensure that both the encoder 400 and a decoder 500 (described below) use the same reference frames and blocks to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder 400 can quantize the residual signal directly without the transform stage 404 for certain blocks or frames. In another implementation, an encoder 400 can have the quantization stage 406 and the dequantization stage 410 combined into a single stage.

Figure 5:
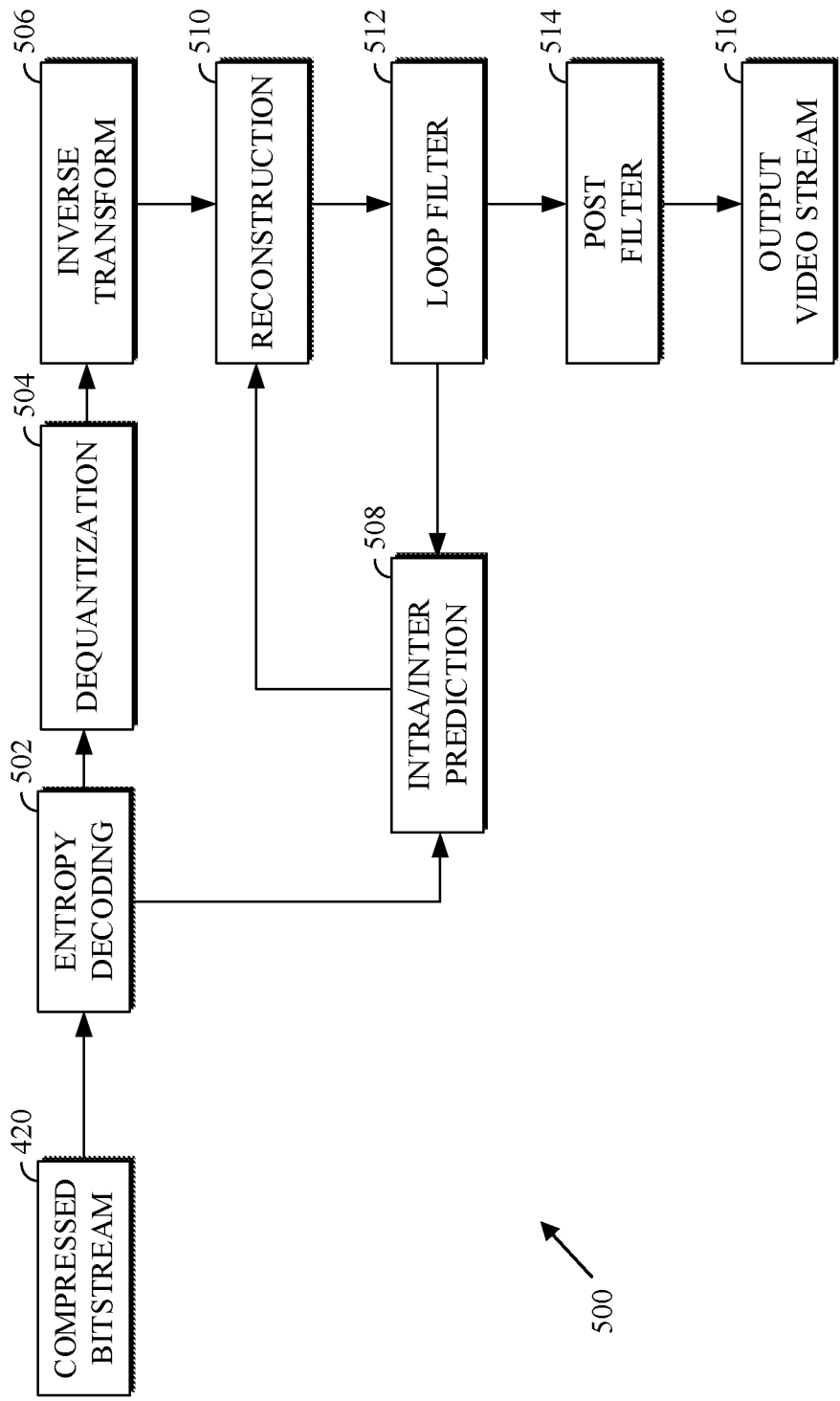
FIG. 5 is a block diagram of a decoder according to implementations of this disclosure.

FIG. 5 is a block diagram of a decoder 500 in accordance with implementations of this disclosure. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described in FIGS. 8 and 9 below. The decoder 500 can also be implemented in hardware included in, for example, the transmitting station 102 or the receiving station 106. The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter-prediction stage 508, a reconstruction stage 510, a loop filtering stage 512 and an optional post filtering stage 514. Other structural variations of the decoder 500 can be used to decode the compressed bitstream 420. The loop filtering stage 512 can include a deblocking filtering stage.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients using the selected transform type to produce a derivative residual that can be identical to that created by the inverse transform stage 412 in the encoder 400. Using header information decoded from the compressed bitstream 420, the decoder 500 can use the intra/inter-prediction stage 508 to create the same prediction block as was created in the encoder 400, e.g., at the intra/inter prediction stage 402. At the reconstruction stage 510, the prediction block can be added to the derivative residual to create a reconstructed block. The loop filtering stage 512 can be applied to the reconstructed block to reduce blocking artifacts. As such, the loop filtering stage 512 can apply deblocking filtering. Other filtering can be applied to the reconstructed block. In an example, the post filtering stage 514 is applied to the reconstructed block to reduce blocking distortion, and the result is output as an output video stream 516. The output video stream 516 can also be referred to as a decoded video stream, and the terms will be used interchangeably herein.

Other variations of the decoder 500 can be used to decode the compressed bitstream 420. For example, the decoder 500 can produce the output video stream 516 without the post filtering stage 514. In some implementations of the decoder 500, the post filtering stage 514 is applied before the loop filtering stage 512. Additionally, or alternatively, the encoder 400 includes a deblocking filtering stage in addition to the loop filtering stage 416.

Figure 6:
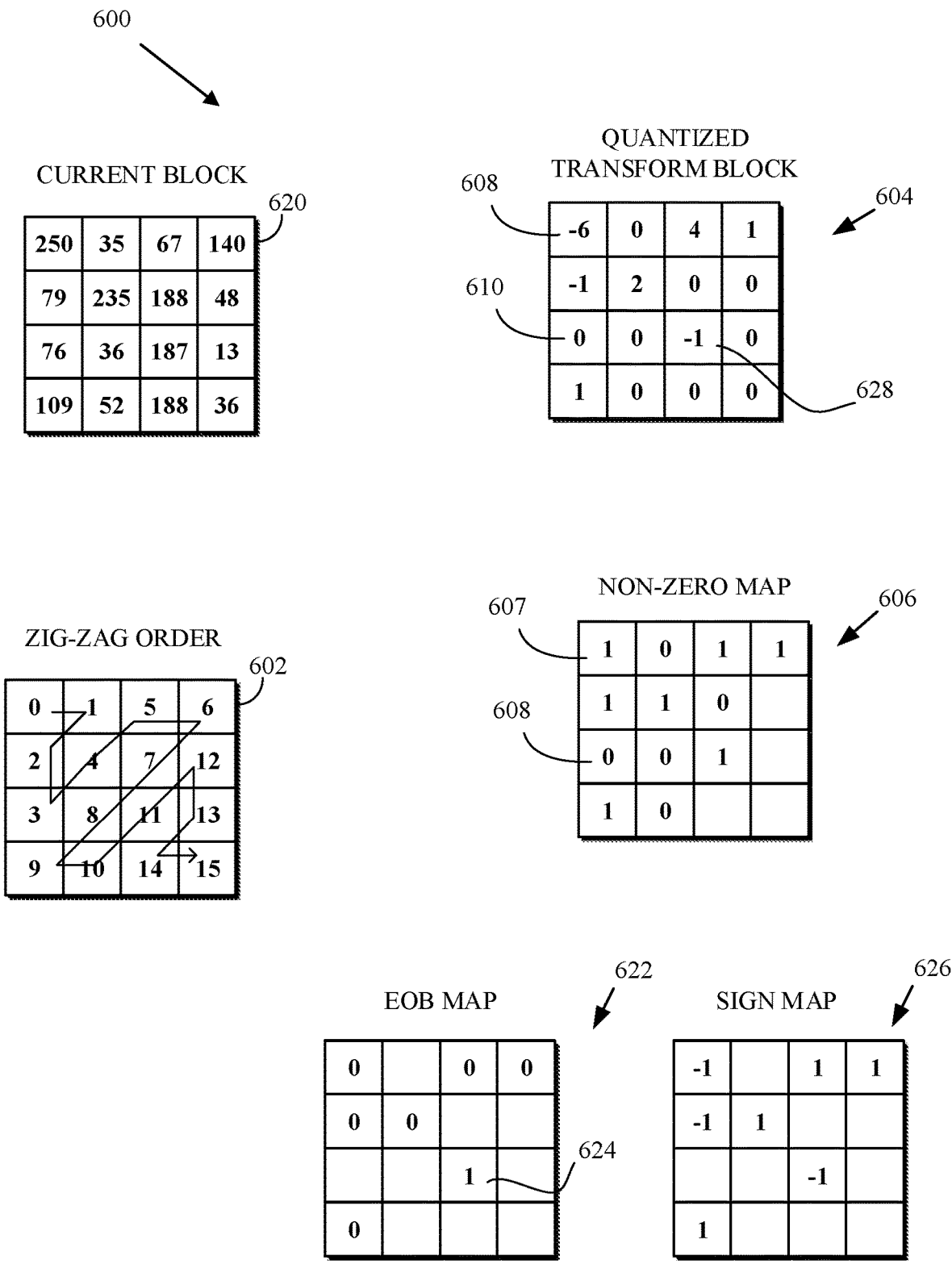
FIG. 6 is a diagram illustrating quantized transform coefficients according to implementations of this disclosure.

FIG. 6 is a diagram 600 illustrating quantized transform coefficients according to implementations of this disclosure. The diagram 600 depicts a current block 620, a scan order 602, a quantized transform block 604, a non-zero map 606, an end-of-block map 622, and a sign map 626. The current block 620 is illustrated as a 4×4 block. However, any block size is possible. For example, the current block can have a size (i.e., dimensions) of 4×4, 8×8, 16×16, 32×32, or any other square or rectangular block size. The current block 620 can be a block of a current frame. In another example, the current frame may be partitioned into segments (such as the segments 308 of FIG. 3), tiles, or the like, each including a collection of blocks, where the current block is a block of the partition.

The quantized transform block 604 can be a block of size similar to the size of the current block 620. The quantized transform block 604 includes non-zero coefficients (e.g., a coefficient 608) and zero coefficients (e.g., a coefficient 610). As described above, the quantized transform block 604 contains quantized transform coefficients for the residual block corresponding to the current block 620. Also as described above, the quantized transform coefficients are entropy coded by an entropy-coding phase, such as the entropy coding stage 408 of FIG. 4.

Entropy coding a quantized transform coefficient can involve the selection of a context model (also referred to as probability context model, probability model, model, and context) which provides estimates of conditional probabilities for coding the binary symbols of a binarized transform coefficient as described below with respect to FIG. 7. When entropy coding a quantized transform coefficient, additional information may be used as the context for selecting a context model. For example, the magnitudes of the previously coded transform coefficients can be used, at least partially, for determining a probability model.

To encode a transform block, a video coding system may traverse the transform block in a scan order and encode (e.g., entropy encode) the quantized transform coefficients as the quantized transform coefficients are respectively traversed (i.e., visited). In a zigzag scan order, such as the scan order 602, the top left corner of the transform block (also known as the DC coefficient) is first traversed and encoded, the next coefficient in the scan order (i.e., the transform coefficient corresponding to the location labeled "1") is traversed and encoded, and so on. In the zigzag scan order (i.e., scan order 602), some quantized transform coefficients above and to the left of a current quantized transform coefficient (e.g., a to-be-encoded transform coefficient) are traversed first. Other scan orders are possible. A one-dimensional structure (e.g., an array) of quantized transform coefficients can result from the traversal of the two-dimensional quantized transform block using the scan order.

In some examples, encoding the quantized transform block 604 can include determining the non-zero map 606, which indicates which quantized transform coefficients of the quantized transform block 604 are zero and which are non-zero. A non-zero coefficient and a zero coefficient can be indicated with values one (1) and zero (0), respectively, in the non-zero map. For example, the non-zero map 606 includes a non-zero 607 at Cartesian location (0, 0) corresponding to the coefficient 608 and a zero 608 at Cartesian location (2, 0) corresponding to the coefficient 610.

In some examples, encoding the quantized transform block 604 can include generating and encoding the end-of-block map 622. The end-of-block map indicates whether a non-zero quantized transform coefficient of the quantized transform block 604 is the last non-zero coefficient with respect to a given scan order. If a non-zero coefficient is not the last non-zero coefficient in the transform block, then it can be indicated with the binary bit zero (0) in the end-of-block map. If, on the other hand, a non-zero coefficient is the last non-zero coefficient in the transform block, then it can be indicated with the binary value one (1) in the end-of-block map. For example, as the quantized transform coefficient corresponding to the scan location 11 (i.e., the last non-zero quantized transform coefficient 628) is the last non-zero coefficient of the quantized transform block 604, it is indicated with the end-of-block value 624 of one (1); all other non-zero transform coefficients are indicated with a zero.

In some examples, encoding the quantized transform block 604 can include generating and encoding the sign map 626. The sign map 626 indicates which non-zero quantized transform coefficients of the quantized transform block 604 have positive values and which quantized transform coefficients have negative values. Transform coefficients that are zero need not be indicated in the sign map. The sign map 626 illustrates the sign map for the quantized transform block 604. In the sign map, negative quantized transform coefficients can be indicated with a −1 and positive quantized transform coefficients can be indicated with a one (1).

Figure 7:
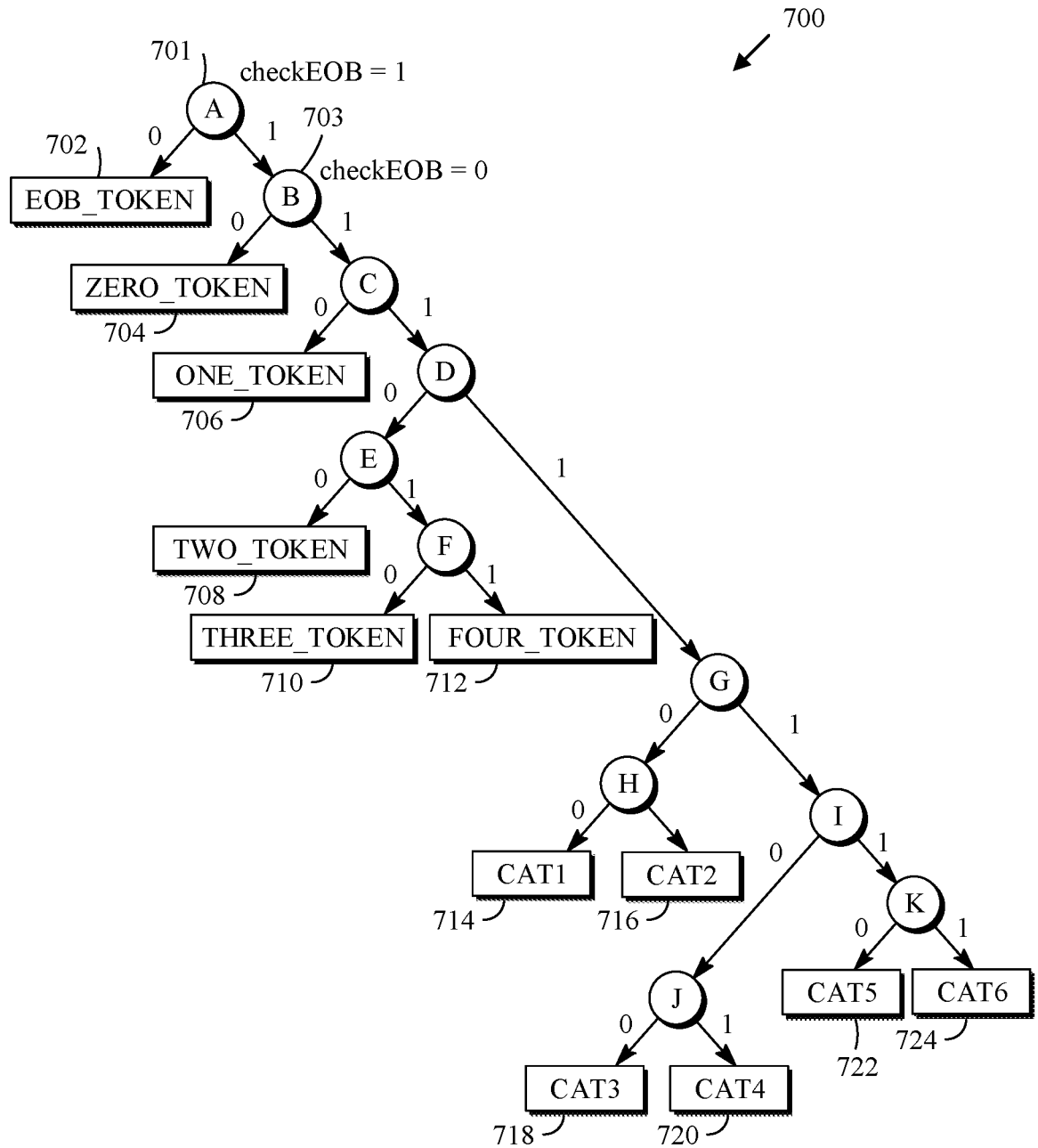
FIG. 7 is a diagram of a coefficient token tree that can be used to entropy code blocks into a video bitstream according to implementations of this disclosure.

FIG. 7 is a diagram of a coefficient token tree 700 that can be used to entropy code blocks into a video bitstream according to implementations of this disclosure. The coefficient token tree 700 is referred to as a binary tree because, at each node of the tree, one of two branches must be taken (i.e., traversed). The coefficient token tree 700 includes a root node 701 and a node 703 corresponding, respectively, to the nodes labeled A and B.

As described above with respect to FIG. 6, when an end-of-block (EOB) token is detected for a block, coding of coefficients in the current block can terminate and the remaining coefficients in the block can be inferred to be zero. As such, the coding of EOB positions can be an essential part of coefficient in a video coding system.

In some video coding systems, a binary decision determining whether (or not) a current token is equal to the EOB token of the current block is coded immediately after an nonzero coefficient is decoded or at the first scan position (DC). In an example, for a transform block of size M×N, where M denotes the number of columns and N denotes the number of rows in the transform block, the maximum number of times of coding whether a current token is equal to the EOB token is equal to M×N. M and N can take values, such as the values 2, 4, 8, 16, 32, and 64. As described below, the binary decision corresponds to the coding of a "1" bit corresponding to the decision to move from the root node 701 to the node 703 in the coefficient token tree 700. Herein, "coding a bit" can mean the outputting or generating of a bit in the codeword representing a transform coefficient being encoded. Similarly, "decoding a bit" can mean the reading (such as from an encoded bitstream) of a bit of the codeword corresponding to a quantized transform coefficient being decoded such that the bit corresponds to a branch being traversed in the coefficient token tree.

Using the coefficient token tree 700, a string of binary digits is generated for a quantized coefficient (e.g., the coefficients 608, 610 of FIG. 6) of the quantized transform block (such as the quantized transform block 604 of FIG. 6).

In an example, the quantized coefficients in an N×N block (e.g., quantized transform block 604) are organized into a 1D (one-dimensional) array (herein, an array u) following a prescribed scan order (e.g., the scan order 602 of FIG. 6). N can be 4, 8, 16, 32, or any other value. The quantized coefficient at the $i^{th}$ position of the 1D array can be referred as u[i], where i=0, . . . , N*N−1. The starting position of the last run of zeroes in u[i], . . . , u[N*N−1] can be denoted as eob. In the case where when u[N*N−1] is not zero, the eob can be set to the value N*N. That is, if the last coefficient of the 1D array u is not zero, then eob can be set to the value N*N. Using the examples of FIG. 6, the 1D array u can have the entries u[ ]=[−6, 0, −1, 0, 2, 4, 1, 0, 0, 1, 0, −1, 0, 0, 0, 0]. The values at each of the u[i]s is a quantized transform coefficient. The quantized transform coefficients of the 1D array u may also be referred herein simply as "coefficients" or "transform coefficients." The coefficient at position i=0 (i.e., u[0]=−6) corresponds to the DC coefficient. In this example, the eob is equal to 12 because there are no non-zero coefficients after the zero coefficient at position 12 of the 1D array u.

To encode and decode the coefficients u[i], u[N*N−1], for i=0 to N*N 1, a token t[i] is generated at each position i<=eob. The token t[i], for i<eob, can be indicative of the size and/or size range of the corresponding quantized transform coefficient at u[i]. The token for the quantized transform coefficient at eob can be an EOB TOKEN, which is a token that indicates that the 1D array u contains no non-zero coefficients following the eob position (inclusive). That is, t[eob]=EOB_TOKEN indicates the EOB position of the current block. Table I provides a listing of an example of token values, excluding the EOB_TOKEN, and their corresponding names according to an implementation of this disclosure.

TABLE I

| Token | Name of Token |
| --- | --- |
| 0 | ZERO_TOKEN |
| 1 | ONE_TOKEN |
| 2 | TWO_TOKEN |
| 3 | THREE_TOKEN |
| 4 | FOUR_TOKEN |
| 5 | DCT_VAL_CAT1 (5, 6) |
| 6 | DCT_VAL_CAT2 (7-10) |
| 7 | DCT_VAL_CAT3 (11-18) |
| 8 | DCT_VAL_CAT4 (19-34) |
| 9 | DCT_VAL_CAT5 (35-66) |
| 10 | DCT_VAL_CAT6 (67-2048) |

In an example, quantized coefficient values are taken to be signed 12-bit integers. To represent a quantized coefficient value, the range of 12-bit signed values can be divided into 11 tokens (the tokens 0-10 in Table I) plus the end of block token (EOB_TOKEN). To generate a token to represent a quantized coefficient value, the coefficient token tree 700 can be traversed. The result (i.e., the bit string) of traversing the tree can then be encoded into a bitstream (such as the bitstream 420 of FIG. 4) by an encoder as described with respect to the entropy encoding stage 408 of FIG. 4.

The coefficient token tree 700 includes the tokens EOB_TOKEN (token 702), ZERO_TOKEN (token 704), ONE_TOKEN (token 706), TWO_TOKEN (token 708), THREE_TOKEN (token 710), FOUR_TOKEN (token 712), CAT1 (token 714 that is DCT_VAL_CAT1 in Table I), CAT2 (token 716 that is DCT_VAL_CAT2 in Table I), CAT3 (token 718 that is DCT_VAL_CAT3 in Table I), CAT4 (token 720 that is DCT_VAL_CAT4 in Table I), CAT5 (token 722 that is DCT_VAL_CAT5 in Table I) and CAT6 (token 724 that is DCT_VAL_CAT6 in Table I). As can be seen, the coefficient token tree maps a single quantized coefficient value into a single token, such as one of the tokens 704, 706, 708, 710 and 712. Other tokens, such as the tokens 714, 716, 718, 720, 722 and 724, represent ranges of quantized coefficient values. For example, a quantized transform coefficient with a value of 37 can be represented by the token DCT_VAL_CAT5-the token 722 in FIG. 7.

The base value for a token is defined as the smallest number in its range. For example, the base value for the token 720 is 19. Entropy coding identifies a token for each quantized coefficient and, if the token represents a range, can form a residual by subtracting the base value from the quantized coefficient. For example, a quantized transform coefficient with a value of 20 can be represented by including the token 720 and a residual value of 1 (i.e., 20 minus 19) in the encoded video bitstream to permit a decoder to reconstruct the original quantized transform coefficient. The end of block token (i.e., the token 702) signals that no further non-zero quantized coefficients remain in the transformed block data.

To encode or decode a token t [i] by using a binary arithmetic coding engine (such as by the entropy encoding stage 408 of FIG. 4), the coefficient token tree 700 can be used. The coefficient token tree 700 is traversed starting at the root node 701 (i.e., the node labeled A). Traversing the coefficient token tree generates a bit string (a codeword) that will be encoded into the bitstream using, for example, binary arithmetic coding. The bit string is a representation of the current coefficient (i.e., the quantized transform coefficient being encoded).

If a current coefficient is zero, and there are no more non-zero values for the remaining transform coefficients, the token 702 (i.e., the EOB_TOKEN) is added into the bitstream. This is the case, for example, for the transform coefficient at scan order location 12 of FIG. 6. On the other hand, if the current coefficient is non-zero, or if there are non-zero values among any remaining coefficients of the current block, a "1" bit is added to the codeword and traversal passes to the node 703 (i.e., the node labeled B). At node B, the current coefficient is tested to see if it is equal to zero. If so, the left-hand branch is taken such that token 704 representing the value ZERO_TOKEN and a bit "0" is added to the codeword. If not, a bit "1" is added to the codeword and traversal passes to node C. At node C, the current coefficient is tested to see if it is greater than 1. If the current coefficient is equal to one (1), the left-hand branch is taken and token 706 representing the value ONE_TOKEN is added to the bitstream (i.e., a "0" bit is added to the codeword). If the current coefficient is greater than one (1), traversal passes to node D to check the value of the current coefficient as compared to the value 4. If the current coefficient is less than or equal to 4, traversal passes to node E and a "0" bit is added to the codeword. At node E, a test for equality to the value "2" may be made. If true, token 706 representing the value "2" is added to the bitstream (i.e., a bit "0" is added to the codeword). Otherwise, at node F, the current coefficient is tested against either the value "3" or the value "4" and either token 710 (i.e., bit "0" is added to the codeword) or token 712 (i.e., bit "1" is added to the codeword) to the bitstream as appropriate; and so on.

Essentially, a "0" bit is added to the codeword upon traversal to a left child node and a "1" bit is added to the codeword upon traversal to a right child node. A similar process is undertaken by a decoder when decoding a codeword from a compressed bitstream. The decoder reads a bit from bit stream. If the bit is a "1," the coefficient token tree is traversed to the right and if the bit is a "0," the tree is traversed to the left. The decoder reads then a next bit and repeats the process until traversal of the tree reaches a leaf node (i.e., a token). As an example, to encode a token t [i]=THREE_TOKEN, starting from the root node (i.e., the root node 701), a binary string of 111010 is encoded. As another example, decoding the codeword 11100 results in the token TWO_TOKEN.

Note that the correspondence between "0" and "1" bits to left and right child nodes is merely a convention used to describe the encoding and decoding processes. In some implementations, a different convention, for example, in one where "1" corresponds to the left child node, and "0" corresponds to the right child node, can be used. As long as both the encoder and the decoder adopt the same convention, the processes described herein apply.

Since an EOB_TOKEN is only possible after a nonzero coefficient, when u[i−1] is zero (that is, when the quantized transform coefficient at location i−1 of the 1D array u is equal to zero), a decoder can infer that the first bit must be 1. The first bit has to be 1 since, in traversing the tree, for a transform coefficient (e.g., transform coefficient at the zig-zag scan order location 2 of FIG. 6) following a zero transform coefficient (e.g., transform coefficient at the zig-zag scan order location 1 of FIG. 6), the traversal necessarily moves from the root node 701 to the node 703.

As such, a binary flag checkEob can be used to instruct the encoder and the decoder to skip encoding and decoding the first bit leading from the root node in the coefficient token tree 700. In effect, when the binary flag checkEob is 0 (i.e., indicating that the root node should not be checked), the root node 701 of the coefficient token tree 700 is skipped and the node 703 becomes the first node of coefficient token tree 700 to be visited for traversal. That is, when the root node 701 is skipped, the encoder can skip encoding and the decoder can skip decoding and can infer a first bit (i.e., a binary bit "1") of the encoded string.

At the start of encoding or decoding a block, the binary flag checkEob can be initialized to 1 (i.e., indicating that the root node should be checked). The following steps illustrate an example process for decoding quantized transform coefficients in an N×N block.

At step 1, the binary flag checkEob is set to zero (i.e., checkEob=0) and an index i is also set to zero (i.e., i=0).

At step 2, a token t[i] is decoded by using either 1) the full coefficient token tree (i.e., starting at the root node 701 of the coefficient token tree 700) if the binary flag checkEob is equal to 1 or 2) using the partial tree (e.g., starting at the node 703) where the EOB_TOKEN is skipped, if checkEob is equal to 0.

At step 3, If the token t[i]=EOB_TOKEN, then the quantized transform coefficients u[i], u[N*N−1] are all to zero and the decoding process terminates; otherwise, extra bits can be decoded if necessary (i.e., when t[i] is not equal to the ZERO_TOKEN) and reconstruct u[i].

At step 4, the binary flag checkEob is set to 1 if u[i] is equal to zero, otherwise checkEob is set to 0. That is, checkEob can be set to the value (u[i]!=0).

At step 5, the index i is incremented (i.e., i=i+1).

At step 6, the steps 2-5 are repeated until all quantized transform coefficients have been decoded (i.e., until the index i=N*N) or until the EOB_TOKEN is decoded.

At step 2 above, decoding a token t[i] can include the steps of determining a context ctx, determining a binary probability distribution (i.e., a model) from the context ctx, and using a boolean arithmetic code to decode a path from the root node of the coefficient token tree 700 to a leaf node by using the determined probability distributions. The context ctx can be determined using a method of context derivation. The method of context derivation can use one or more of the block size, plane type (i.e., luminance or chrominance), the position i, and previously decoded tokens t[0], . . . , t[i−1] to determine the context ctx. Other criteria can be used to determine the context ctx. The binary probability distribution can be determined for any internal node of the coefficient token tree 700 starting from the root node 701 when checkEOB=1 or from the node 703 when checkEOB=0.

In some coding systems, the probability used to encode or decode a token t[i] given a context ctx may be fixed and does not adapt in a picture (i.e., a frame). For example, the probability may be either a default value that is defined for the given context ctx or the probability may be coded (i.e., signaled) as part of the frame header for that frame. Coding the probability for every context in coding a frame can be costly. As such, an encoder may analyze, for each context, whether it is beneficial to code the context's associated probability in the frame header and signal its decision to the decoder by using a binary flag. Furthermore, coding the probability for a context may use prediction to reduce cost (e.g., in bit rate) where the prediction may be derived from the probability of the same context in a previously decoded frame.

In some coding systems, instead of traversing a coefficient token tree, such as the coefficient token tree 700, to code a transform coefficient, each token can be associated with a value that is coded. As such, instead of a coding binary symbols (i.e., selected from an alphabet comprised of the symbols {0, 1}), an alphabet of symbols that includes more than two symbols is used for coding transform coefficients. In an example, the alphabet includes 12 symbols, namely {EOB_TOKEN, ZERO_TOKEN, ONE_TOKEN, TWO_TOKEN, THREE_TOKEN, FOUR_TOKEN, DCT_VAL_CAT1, DCT_VAL_CAT2, DCT_VAL_CAT3, DCT_VAL_CAT4, DCT_VAL_CAT5, DCT_VAL_CAT6}. As such, the alphabet for coding transform coefficients includes 12 symbols, which are also referred to as tokens. Other token alphabets that include more, less, or other tokens are possible. An alphabet that includes only the symbols {0, 1} is referred to herein as a binary alphabet. An alphabet that includes symbols other than and/or in addition to the symbols {0, 1} is referred to herein as a non-binary alphabet. Each of the tokens can be associated with a value. In an example, the EOB_TOKEN can have a value of 255. Each of the other tokens can each be associated with a different value.

Figure 8:
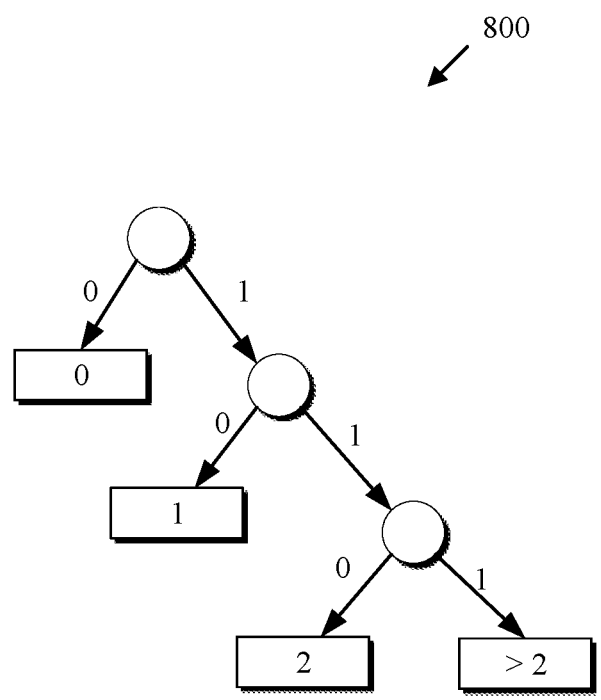
FIG. 8 is a diagram of an example of a tree for binarizing a quantized transform coefficient according to implementations of this disclosure.

FIG. 8 is a diagram of an example of a tree 800 for binarizing a quantized transform coefficient according to implementations of this disclosure. The tree 800 is a binary tree that can be used for binarizing quantized transform coefficients in some video coding systems. The tree 800 can be used by a video coding system that uses the steps of binarization, context modelling, and binary arithmetic coding for encoding and decoding of quantized transform coefficients. The process may be referred to as context-adaptive binary arithmetic coding (CABAC). For example, to code a quantized transform coefficient x, the coding system may perform the following steps. The quantized transform coefficient x can be any of the coefficients (e.g., the coefficient 608) of the quantized transform block 604 of FIG. 6.

In the binarization step, a coefficient x is first binarized into a binary string by using the tree 800. The binarization process may binarize the unsigned value of the coefficient x. For example, binarizing the coefficient 628 (i.e., the value −1), binarizes the value 1. This results in traversing the tree 800 and generating the binary string 10. Each of the bits of the binary string 10 is referred to as a bin.

In the context derivation step, for each bin to be coded, a context is derived. A context can be derived from information such as one or more of the block size, plane type (i.e., luminance or chrominance), block position of the coefficient x, and previously decoded coefficients (e.g., a left and/or above neighboring coefficients, if available). Other information can be used to derive the context.

In the binary arithmetic coding step, given a context, a bin is coded by using, e.g., a binary arithmetic coding engine into a binary codeword together with a probability value associated with the context.

The steps of coding a transform coefficient can include a step that is referred as context update. In the context update step, after a bin is coded, the probability associated with the context is updated to reflect the value of the bin.

Mixing of probability models is now described for coding (i.e., encoding or decoding) a sequence $x^n$ of length n. For simplicity, two (2) models are used. However, this disclosure is not so limited and any number of models can be mixed.

For any sub-sequence of length i of the sequence $x^n$ where $1 \le i \le n$, probability $p_k(x^i)$ denotes the probability of the subsequence $x^i$ estimated by using the model k, where k=1, 2. Using a corresponding weighting factor $w_k$ for each model, the two models can be mixed using equation (2):

$$\tilde{p}(x^i) = \Sigma_{k=1}^{2} w_k p_k(x^i), \text{ for each } i \qquad (2)$$

In equation (2), $\tilde{p}(x^i)$ is the mixed probability of the sub-sequence $x^i$. As such, the mixing can produce partial (or intermediate) results for each sub-sequence $x^i$. The sub-sequence $x^i$ is $x^i = x_1 x_2 x_3 \ldots x_i$. The first model (i.e., k=1) produces the sub-sequence probability $p_1(x^i)$; and the second model (i.e., k=2) produces the sub-sequence probability $p_2(x^i)$.

In an example, and as it may not be known a priori which model should have the priority, a simple mixture can be used. For example, uniform weighting can be used. That is, the weight factors $w_k$ can be chosen such that $w_k = \frac{1}{2}$. As such, the equation (2) can be re-written as:

$$\tilde{p}(x^i) = \frac{1}{2} \sum_{k=1}^{2} p_k(x^i), \text{ for each } i \qquad (3)$$

The mixed probability $\tilde{p}(x^i)$ is the probability of a sub-sequence. However, arithmetic coding is performed on a symbol-by-symbol basis (i.e., not on sequences of symbols). As such, the mixed probability $\tilde{p}(x^i)$ cannot directly be used for entropy coding. This can be addressed by converting the mixed probability $\tilde{p}(x^i)$ into a product of conditional probabilities as described below. Let $\tilde{p}(x_i | x^{i-1})$ denote the conditional probability of a symbol at position i having a certain value given that the previous symbols result in the sub-sequence $x^{i-1}$. That is, the mixed probability $\tilde{p}(x^i)$ can be given by equation (4):

$$\tilde{p}(x^i) = \tilde{p}(x_1) * \tilde{p}(x_2 | x^1) * \ldots * \tilde{p}(x_i | x^{i-1}) \qquad (4)$$

Using the elementary conditional probability formula $P(A|B) = P(A \cap B) / P(B)$, where $P(A \cap B)$ is the probability of both events A and B occurring, the equation (4) can be rewritten as equation (5):

$$\tilde{p}(x_i | x^{i-1}) = \tilde{p}(x_i \cap x^{i-1}) / \tilde{p}(x^{i-1}) = \tilde{p}(x^i) / \tilde{p}(x^{i-1}) \qquad (5)$$

It is noted that the mixed probability) of both $x_i$ and $x^{i-1}$ occurring is the same as the mixed probability of $x^i$ alone because the sub-sequence $x^i$ includes the sub-sequence $x^{i-1}$ and has the symbol $x_i$.

The equation (5) can be rewritten using the equation (3). That is, each of the sub-sequence mixed probabilities (i.e., the numerator and denominator) of equation (5) can be rewritten in terms of the model probabilities. The equation (5) can be rewritten as equation (6):

$$\tilde{p}(x_i | x^{i-1}) = \qquad (6)$$
$$\frac{1}{2} \sum_{k=1}^{2} p_k(x^i) \bigg/ \frac{1}{2} \sum_{k=1}^{2} p_k(x^{i-1}) = \frac{p_1(x^i)}{\sum_{k=1}^{2} p_k(x^{i-1})} + \frac{p_2(x^i)}{\sum_{k=1}^{2} p_k(x^{i-1})}$$

Multiplying the first quantity and the second quantity of the equation (6) each by a factor equaling one (1) (i.e., $$\frac{p_1(x^i - 1)}{p_1(x^{i-1})} \text{ and } \frac{p_2(x^i - 1)}{p_2(x^{i-1})},$$

respectively), equation (7) is obtained:

$$\tilde{p}(x_i | x^{i-1}) = \frac{p_1(x^{i-1})}{\sum_{k=1}^{2} p_k(x^{i-1})} * \frac{p_1(x^i)}{p_1(x^{i-1})} + \frac{p_2(x^{i-1})}{\sum_{k=1}^{2} p_k(x^{i-1})} * \frac{p_2(x^i)}{p_2(x^{i-1})} \qquad (7)$$

Equation (7) can be written as equation (8):

$$\tilde{p}(x_i | x^{i-1}) = w_{i,1} * p_1(x_i | x^{i-1}) + w_{i,2} * p_2(x_i | x^{i-1}) \qquad (8)$$

It is noteworthy that the conditional probabilities of $p_1(x_i | x^{i-1})$ and $p_2(x_i | x^{i-1})$ are available as a result of the encoding (and, similarly, decoding) of a sequence up to the $i^{th}$ symbol by using model 1 and model 2, respectively. That is, starting from respective initial states, each model k can maintain and keep track of the conditional probabilities $p_k(x_i | x^{i-1})$ throughout the coding process. For example, after a symbol $x_i$ is coded (e.g., encoded or decoded), the probability $p_k(x_i | x^{i-1})$ can be updated to obtain $p_k(x_{j+1} | x^i)$ for the next symbol $x_{i+1}$. The probabilities can be updated using a same prescribed process by an encoder and a decoder. The encoder and the decoder can follow the same prescribed process for maintaining and updating the probabilities for a model k. In some implementations, the maintaining and updating of the probabilities is not performed each time a symbol $x_i$ is coded. As such, the probability $p_k(x_i | x^{i-1})$ can have a form $p_k(x_i | c_{k,i})$ where $c_{k,i}$ can be referred to as the context used to code $x_i$. Each model k can have a respective method to derive the respective context $C_{k,i}$ from $x^{i-1}$ and other information available for the model k. The probabilities $p_k(x_i | c_{k,i})$ can be stored and maintained in a memory where the context $c_{k,i}$ can be used as an index to access the memory. In implementations according to this disclosure, the conditional probabilities are mixed and the sequence is then encoded (or decoded) using the mixed probability (i.e., $\tilde{p}(x_i | x^{i-1})$).

In equation (8), $w_{i,1}$ and $w_{i,2}$ are weights that are respectively equal to $$\frac{p_1(x^{i-1})}{\sum_{k=1}^{2} p_k(x^{i-1})} \text{ and } \frac{p_2(x^{i-1})}{\sum_{k=1}^{2} p_k(x^{i-1})},$$

and $p_1(x_i | x^{i-1})$ and $p_2(x_i | x^{i-1})$ are respectively equal to $$\frac{p_1(x^i)}{p_1(x^{i-1})} \text{ and } \frac{p_2(x^i)}{p_2(x^{i-1})}.$$

As such, the mixed probability $\tilde{p}(x_i|x^{i-1})$ is now expressed as a linear combination of the conditional probability of the first model (i.e., $p_1(x_i|x^{i-1})$) and the conditional probability of the second model (i.e., $p_2(x_i|x^{i-1})$) where each of the conditional probabilities is multiplied by a respective weighting factor. It is worth pointing out that even if both model 1 and model 2 are memoryless (i.e., $p_k(x^i) = \Pi_{j=1}^{i} p_k(x_j)$), the mixed probability $$\tilde{p}(x^i) = \frac{1}{2}\sum_{k=1}^{2} p_k(x^i),$$

in general, does not have a simple product form, such as $\Pi_{j=1}^{i}\tilde{p}(x_j)$. Furthermore, the weights $w_{i,1}$ and $w_{i,2}$ can have different values for different symbols. That is, the weights $w_{i,1}$ and $w_{i,2}$ can vary at different values of i.

When the joint distributions are mixed using the equation (3), uniform weighting factors (i.e., ½) were used. However, when conditional probabilities are mixed (as in the equation (8)), the weighting (i.e., $w_{i,1}$ for the first model and $w_{i,2}$ for the second model) may no longer be uniform. The weight $w_{i,1}$ for the conditional probability of the first model is equal to the joint probability of $x^{i-1}$ given by the first model divided by the sum of the joint probability of $x^{i-1}$ given by the first model and the joint probability of $x^{i-1}$ given by the second model. Similarly for weight $w_{1,2}$. In equation (8), for the sub-sequence $x^{i-1}$, the first model provides a first probability and the second model provides a second probability and the weighting factor for the conditional probability of $x_i$ given $x^{i-1}$ is equal to the probability given by each of the first model and the second model divided by the sum of the joint probabilities given by both models. That is, in the mixing of the conditional probabilities, if, for example, the first model provides a higher probability for the sub-sequence $x^{i-1}$, then the first model ends up having a higher weighting factor (i.e., weight $w_{i,1}$) than that of the second model.

The joint probabilities are real numbers and the calculating of the weights $w_{i,1}$ and $w_{i,2}$ involves the division of real numbers. As such, the computing of the weights $w_{i,1}$ and $w_{i,2}$ may be complex and expensive. It is desirable to approximate the weights $w_{i,1}$ and $w_{i,2}$ with fixed-point representations such that, for example, the exact number of bits to represent each of the weights can be known and such that division operations can be avoided.

As described above, there is a correlation and/or relationship between the probability of a codeword and the length, in bits, of the codeword generated using the probability of the codeword. Namely, the length (i.e., number of bits) of the codeword is given by $-\log_2(p)$. The lengths of the codewords generated by each model can be used to approximate the weights $w_{i,1}$ and $w_{i,2}$. That is, $-\log(p_k(x^{i-1}))$ can be approximated by the codeword length $l_k(x^{i-1})$ in bits resulting from using model k, for k=1, 2, to encode $x^{i-1}$. As such, the weight $w_{i,1}$ (and, similarly, the weight $w_{i,2}$) can be approximated using equation (9):

$$w_{i,1} = \frac{p_k(x^{i-1})}{\sum_{j=1}^{2} p_j(x^{i-1})} \approx \frac{2^{-l_1(x^{i-1})}}{\sum_{j=1}^{2} 2^{-l_j(x^{i-1})}} = \frac{1}{1 + 2^{l_1(x^{i-1}) - l_2(x^{i-1})}} \quad (9)$$

When $l_2(i-1)$ is equal to $l_1(i-1)$, then it follows that $w_{i,1} = w_{i,2} = 0.5$. Assuming, without losing generality, that $l_1(i-1)$ is smaller than $l_2(i-1)$, then the equation (9) can result by expanding the denominator and then eliminating $2^{-l_1(x^{i-1})}$ from the denominator and numerator.

To determine a length $l_k(x^i)$ according to a model k of a sub-sequence of length i, a hypothetical encoding process can be used. A hypothetical encoding process is a process that carries out the coding steps but does not generate actual codewords or output bits into an encoded bitstream. Since the purpose is to estimate $l_k(x^i)$, which are interpreted in some applications as a bitrate (or a simply rate), a hypothetical encoding process may be regarded or called a rate estimation process. The hypothetical encoding process, using a probability model, computes or estimates the codeword length for a sequence. The codeword length may be determined (i.e., measured) with or without generating a codeword. For example, at time instance i, coding the sequence $x^{i-1}$ using a first model generates a codeword of length $l_1(i-1)$ and using a second model generates a codeword of length $l_2(i-1)$. In an example, multiple hypothetical encoders can be available and executing in parallel. For example, a standard rate estimator for an arithmetic encoder can be available for each model. Each rate estimator can provide (or, can be used to provide) an estimate of the length of the codeword that may be produced by the encoder for a sub-sequence given a model.

Given two competing models at a time instance i, if the first model provides less bits than the second model, then the weight assigned (using equation 9) to the first model will be greater than the weight assigned to the second model for the sequence up to the symbol at position $x_{i-1}$. Eventually (i.e., when encoding the sequence $x^n$ is completed using the mixed probability), the winning model (i.e., the model with higher weight) is the model that produces less bits, which is a desired result of compression.

The weight $w_{i,1}$ is approximated (in equation (9)) using a power of 2 and, as such, can be efficiently computed.

The weight $w_{i,1}$ can be further simplified. The right-hand-side of the equation (9) is of the form $1/(1-r)$ where $r = -2^{l_1(x^{i-1}) - l_2(x^{i-1})}$. This can be recognized as a geometric series given by $1 + r + r^2 + \cdots$ with a common ratio $r = -2^{l_1(x^{i-1}) - l_2(x^{i-1})}$. As such, The weight $w_{i,1}$ can be approximated using equation (10):

$$w_{i,1} \approx \sum_{j=0}^{\infty} (-2^{l_1(x^{i-1}) - l_2(x^{i-1})})^j \quad (10)$$

As such, $w_{i,1} * p_1(x_i|x_{i-1})$ of the equation (8) can be rewritten as in equation (11):

$$w_{i,1} p_1(x^i|x^{i-1}) = \sum_{j=0}^{\infty} (-2^{l_1(x^{i-1}) - l_2(x^{i-1})})^j p_1(x_i|x^{i-1}) = \sum_{j=0}^{\infty} (-1)^j 2^{j[l_1(x^{i-1}) - l_2(x^{i-1})]} p_1(x_i|x^{i-1}) \quad (11)$$

In equation (11), $2^{j[l_1(x^{i-1}) - l_2(x^{i-1})]} p_1(x_i|x^{i-1})$ can be efficiently computed using shifts in cases where $p_1(x_i|x^{i-1})$ has a fixed-point representation. Moreover, when $p_1(x_i|x^{i-1})$ has a fixed-point representation, then the infinite sum in equation (11) can be truncated into a sum of a finite number of terms. For example, when $p_1(x_i|x^{i-1})$ has an 8-bit representation, then the sum can be truncated to keep only the first eight (8) terms $\sum_{j=0}^{7}(-1)^j 2^{j[l_1(x^{i-1}) - l_2(x^{i-1})]} p_1(x_i|x^{i-1})$ since for any $j \geq 8$, $2^{j[l_1(x^{i-1}) - l_2(x^{i-1})]} p_1(x_i|x^{i-1}) = 0$ when $l_1(x^{i-1}) - l_2(x^{i-1}) \leq -1$ (that is, when they differ by at least one bit). When, $l_1(x^{i-1}) - l_2(x^{i-1}) < -1$, (that is, when they differ by more than one bit), $2^{j[l_1(x^{i-1}) - l_2(x^{i-1})]} p_1(x_i|x^{i-1}) = 0$ for any $j \geq j^*$ where $j^* < 8$. As such, only the first $j^*$ terms are needed to compute $w_{i,1} p_1(x^i|x^{i-1})$.

The weight $w_{i,2}$ can be computed using equation (12):

$$w_{i,2} \approx \frac{2^{-l_2(x^{i-1})}}{\sum_{j=1}^{2} 2^{-l_j(x^{i-1})}} = \qquad(12)$$

$$\frac{2^{l_1(x^{i-1})-l_2(x^{i-1})}}{1+2^{l_1(x^{i-1})-l_2(x^{i-1})}} = 2^{l_1(x^{i-1})-l_2(x^{i-1})} \sum_{j=0}^{\infty} \left(-2^{l_1(x^{i-1})-l_2(x^{i-1})}\right)^j$$

The quantity $w_{i,2}*p_2(x_i|x^{i-1})$ of equation (8) can be computed using equation (13):

$$\begin{aligned}w_{i,2}p_2(x^i|x^{i-1}) &= 2^{l_1(x^{i-1})-l_2(x^{i-1})} \sum_{j=0}^{\infty}(-2^{l_1(x^{i-1})-l_2(x^{i-1})})^j p_2 \\ (x_i|x^{i-1}) &= \sum_{j=0}^{\infty}(-1)^j 2^{(j+1)[l_1(x^{i-1})-l_2(x^{i-1})]} p_2(x_i|x^{x-1})\end{aligned} \qquad(13)$$

As in equation (11), the right hand side of equation (13) can be simplified by truncating the infinite sum into a finite sum when $p_2(x_i|x^{i-1})$ has a fixed-point representation.

As described above, mixing of joint probabilities of models can use simple uniform mixing as it may not be known a priori which model provides better compression. The uniform mixing of the joint probabilities uses conditional probabilities and results in the selection of a winning model (i.e., a model with higher weighting).

Some video data can be non-stationary within a frame/picture. That is, the statistics of one transform block may be substantially different from, e.g., the immediately subsequent transform block. As such, mixing of probability models can be used to adapt the probability distributions to the local statistics of a current transform block being coded. Using mixing of probabilities to adapt to the local statistics of a current block is referred to herein as local mixing for a transform block.

Since, as mentioned above, the statistics of a current block may be significantly different from those of a previous transform block, in the case of local mixing for a transform block, the coding history of previous transform blocks is not used for the current block. As such, the mixing of probability models can start at the boundaries of the current transform block.

In local mixing for a transform block, the sub-sequence $x^i$ of equation (2) (i.e., $\tilde{p}(x^i) = \sum_{k=1}^{2} w_k p_k(x^i)$, for each i) can represent the quantized transform coefficients of the quantized transform block being coded and k can represent models for coding the transform coefficients (i.e., the sub-sequence) $x^i$. Examples of the models include a context model, a speed or method (e.g. Laplace, Good-Turing, the Krichevsky-Trofimov estimator, or other method) of adapting probabilities, an initial distribution, other model, or a combination thereof. As such, the sequence $x^i$ can represent all the coded coefficients (i.e., coded quantized transform coefficients) of a transform block (i.e., a quantized transform block) up to and including a current quantized transform coefficient. As indicated above, the coefficients of a transform block are coded in a scan order. As such, the sub-sequence $x^i$ includes all the transform coefficients that precede the current coefficient $x_i$ (i.e., the sequence of coefficients $x^{i-1}$) in the scan order and includes the current coefficient $x_i$. The index i can, in the case of local mixing, represent, or be indicative of, the scan position in a scan order.

Figure 9:
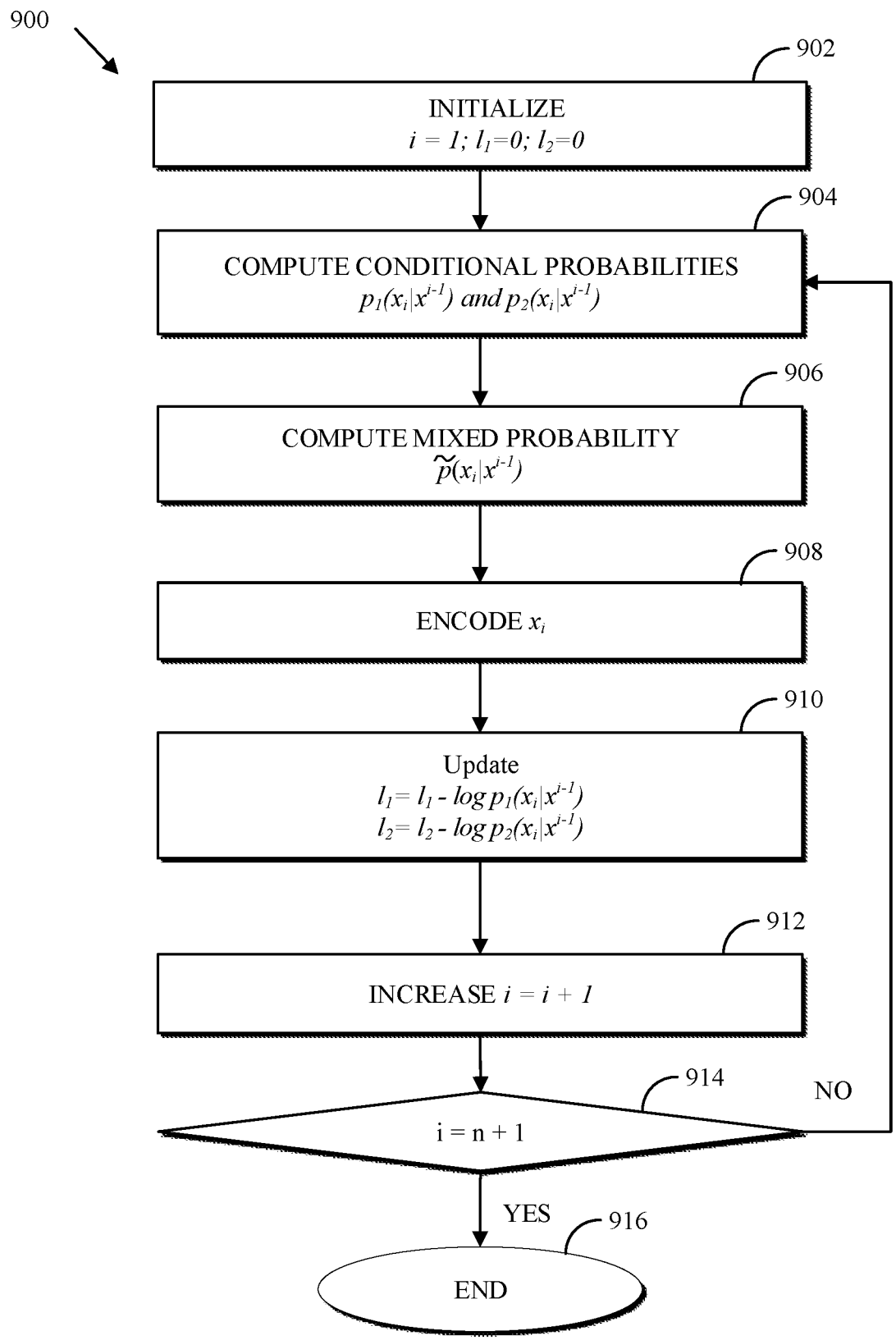
FIG. 9 is a flowchart diagram of a process for encoding a sequence of symbols according to an implementation of this disclosure.

FIG. 9 is a flowchart diagram of a process 900 for encoding a sequence of symbols according to an implementation of this disclosure. The process 900 can receive a sequence of symbols of size n. The sequence can be denoted by $x^n$. Receive, can mean generate, determine, or in any way receive. In an example, the sequence of symbols can represent a quantized transform coefficient such as one received at the entropy encoding stage 408 from the quantization stage 406 of FIG. 4. In an example, the sequence of symbols can be a token such as a token described with respect to FIG. 7. In an example, the sequence of symbols can be a binarized value such as a binarized value described with respect to FIG. 8. The sequence of symbols can be any sequence of symbols that is encoded based on a probability model.

The process 900 can be implemented in an encoder such as the encoder 400 of FIG. 4. The process 900 can be implemented, for example, as a software program that can be executed by computing devices such as transmitting station 102. The software program can include machine-readable instructions that can be stored in a memory such as the memory 204 or the secondary storage 214, and that can be executed by a processor, such as CPU 202, to cause the computing device to perform the process 900. In at least some implementations, the process 900 can be performed in whole or in part by the entropy encoding stage 408 of the encoder 400 of FIG. 4.

The process 900 uses at least two probability models to encode the sequence of symbols $x^n$. The process 900 can use any number of probability models. However, for simplicity only two (2) models (i.e., a first model and a second model) are used to illustrate the process 900. The process 900 encodes each of the symbols of the sequence the symbols by mixing the probabilities of the first model and the second model.

At 902, the process 900 initializes a counter i to zero (0), a first sub-sequence length (i.e., first length $l_1$) to 0, and a second sub-sequence length (i.e., second length $l_2$) to zero (0). The counter i is used for each symbol of the sequence $x^n$. The first length $l_1$ and the second length $l_2$ are as described above. That is, the first length $l_1$ and the second length $l_2$ can correspond, respectively, to the lengths of codewords generated by arithmetic coding engines using, respectively, the first model and the second model.

At 904, the process 900 computes the conditional probabilities $p_1(x_i|x^{i-1})$ and $p_2(x_i|x^{i-1})$ as described above. The conditional probability $p_1(x_i|x^{i-1})$ is the conditional probability of the symbol at position i of the sequence of symbols given the probability of the subsequence $x^{i-1}$ (i.e., the sub-sequence up to and excluding the symbol $x_i$). Similarly for $p_2(x_i|x^{i-1})$.

At 906, the process 900 computes the mixed probability $\tilde{p}(x_i|x^{i-1})$ for the symbol $x_i$. The process 900 computes the mixed probability described in equation (4) above. The process 900 can compute the mixed probability using the equations 8, 11, and 13. At 908, the process 900 encodes the symbol $x_i$ using the computed mixed conditional probability.

At 910, the process 900 updates the first length $l_1$ and the second length $l_2$. As described above, hypothetical arithmetic encoders can be used at 910. The first length $l_1$ is updated to include the additional codeword length (i.e., bits) added to the hypothetical codeword added by the first model when encoding the symbol $x_i$. The second length $l_2$ is updated to include the additional codeword length (i.e., bits) added to the hypothetical codeword added by the second model when encoding the symbol $x_i$. The process 900, updates the first length $l_1$ and the second length $l_2$ using, respectively, $l_1 = l_1 - \log(p_1(x_i|x^{i-1}))$ and $l_2 = l_2 - \log(p_2(x_i|x^{i-1}))$. In an implementation, the values $-\log(p_1(x_i|x^{i-1}))$ and $-\log(p_2(x_i|x^{i-1}))$ can be computed and/or approximated by using a lookup table (i.e., looked up in a lookup table). Note that the probabilities $p_1(x_i|x^{i-1})$ and $p_2(x_i|x^{i-1})$ are probabilities between zero (0)

and one (1). The conditional probabilities $p_1(x_i|x^{i-1})$ and $p_2(x_i|x^{i-1})$ can each be represented and/or approximated using fixed-point representations (e.g., 8-bit integer fixed-point representation). As such, both $-\log(p_1(x_i|x^{i-1}))$ and $-\log(p_2(x_i|x^{i-1}))$ can be estimated by using a lookup table. The 8-bit integers (i.e., which represent the probability values $p_1(x_i|x^{i-1})$ or $p_2(x_i|x^{i-1})$) can be used as inputs (i.e., indexes) into the lookup table. In general, the size of the lookup table depends upon the width of the fixed point representation of $p_1(x_i|x^{i-1})$ and $p_2(x_i|x^{i-1})$. That is, the larger the width, the higher the precision in estimating $-\log(p_1(x_i|x^{i-1}))$ and $-\log(p_2(x_i|x^{i-1}))$.

At 912, the counter i is incremented so that the next symbol $x_{i+1}$ is processed. At 914, if all the symbols have been processed (i.e. i=n+1), then the process terminates at 916. Otherwise, the process returns to 904 to process the next symbol.

Figure 10:
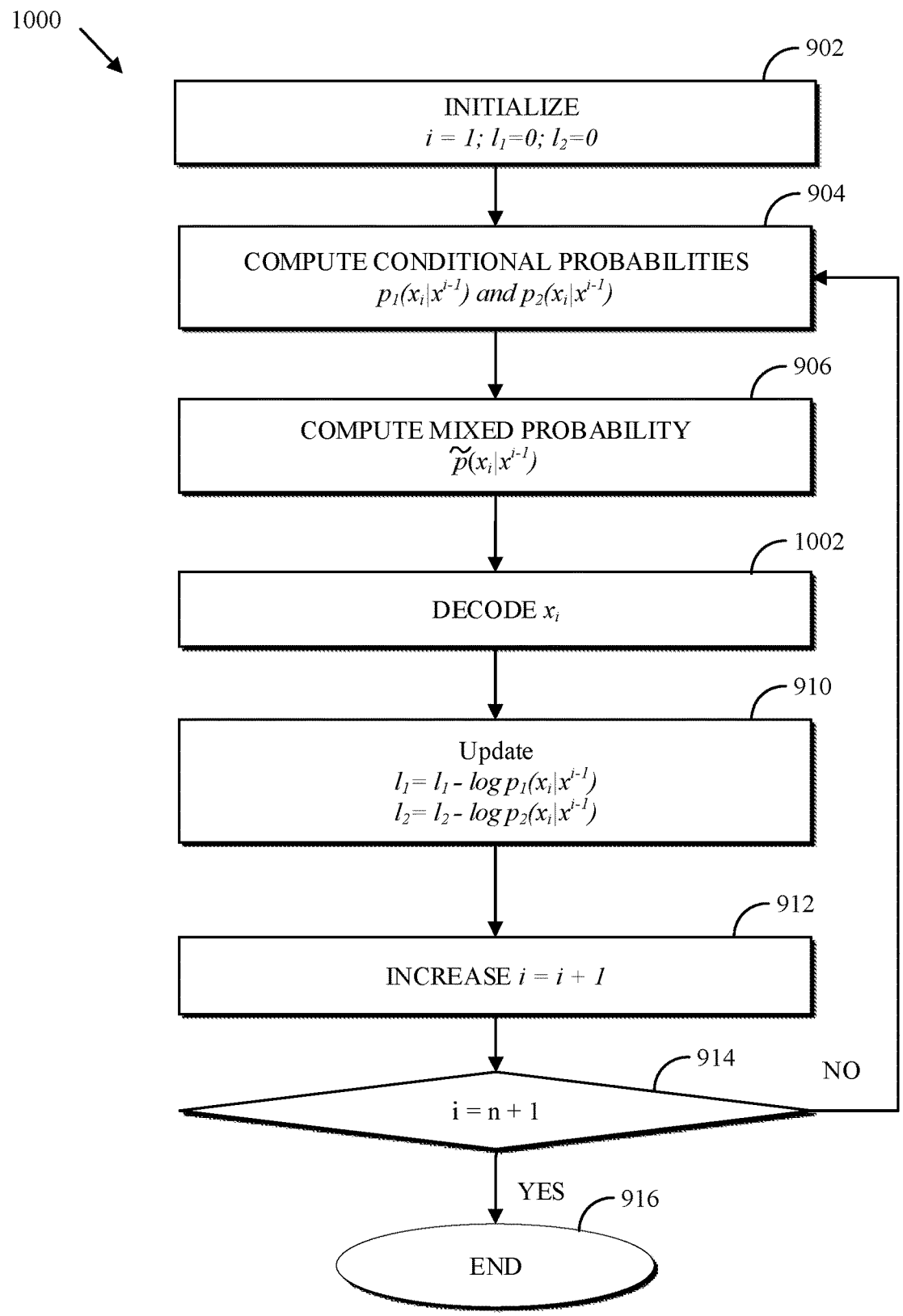
FIG. 10 is a flowchart diagram of a process for decoding a sequence of symbols according to an implementation of this disclosure.

FIG. 10 is a flowchart diagram of a process 1000 for decoding a sequence of symbols according to an implementation of this disclosure. The process 1000 can be implemented in a decoder such as the decoder 500. The process 1000 can be implemented by a receiving station. The process 900 can be implemented, for example, as a software program that can be executed by computing devices. The software program can include machine-readable instructions that can be stored in a memory such as the memory 204 or the secondary storage 214, and that can be executed by a processor, such as CPU 202, to cause the computing device to perform the process 900. The process 900 can be implemented using specialized hardware or firmware. Some computing devices can have multiple memories, multiple processors, or both. The steps or operations of the process 1000 can be distributed using different processors, memories, or both. Use of the terms "processor" or "memory" in the singular encompasses computing devices that have one processor or one memory as well as devices that have multiple processors or multiple memories that can be used in the performance of some or all of the recited steps.

The process 1000 can be used to decode a sequence of symbols from an encoded bitstream. For example, the process 1000 can receive an encoded bitstream, such as the compressed bitstream 420 of FIG. 5. The process 1000 can include blocks similar to the blocks 902-906 and 910-916 as the process 900. Descriptions of the similar blocks are omitted. Instead of the block 908, the process 1000 includes the block 1002. At 1002, the process 1000 decodes, from the encoded bitstream, the symbol x using the computed mixed conditional probability (i.e., $\tilde{p}(x_i|x^{i-1})$).

In some implementations of the processes 900 or 1000, the block 906 may be performed every number of steps (e.g., S>1) to further save (e.g., reduce) computational complexity or to improve throughput. Throughput can be measured in the number symbols processed (coded or decoded) in one clock cycle. For example, when the number of steps S=2, block 906 may be performed only when i is odd or even, but not both. In another implementation of the processes 900 or 1000, block 906 may be performed at a predefined subset of all possible indices of i.

The foregoing described the use of uniform weighting of the models. However, implementations according to this disclosure can use non-uniform prior weights. In non-uniform weighting using M number of models, at least some of the weights $w_k$ can be set to values that are not equal to 1/M (i.e., $w_k \neq 1/M$).

For simplicity, the foregoing (e.g., the processes 900 and 1000) describes the use of two models: a first model and a second model. However, implementations according to this disclosure can be extended to any number of models. For example, for a number of model M≥2, and assuming uniform weighting factors $w_k$ (i.e., $w_k=1/M$), then the weights $w_{i,k}$ can be approximated using formula (14):

$$w_{i,k} \approx \frac{w_k 2^{-l_k(x^{i-1})}}{\sum_{j=1}^{M} w_j 2^{-l_j(x^{i-1})}} \qquad (14)$$

In formula 14, $l_k(x^{i-1})$ denotes the codeword length, in bits, resulting from using model k, 1≤k≤M, to encode the sub-sequence $x^{i-1}$.

In the descriptions of FIGS. 9-10, and in the case of a codec that uses a binary tree for coding transform coefficients or a codec that codes an alphabet of binary symbols, the symbol at position i (i.e., $x_i$) refers to a symbol from a binary alphabet {0, 1}. In the case of a codec that uses an alphabet of tokens (i.e., a non-binary alphabet) for coding transform coefficients, the symbol at position i (i.e., $x_i$) refers to a symbol from the non-binary alphabet.

At 910 of FIGS. 9-10, a lookup table can be used in calculating the first length $l_1$ and the second length $l_2$. In the general case, where k models are used, the length $l_k(x^{i-1})$ can be determined using the lookup table. In the case of non-binary alphabets, additional steps are required in order to use a lookup table. In the case of binary alphabets, the probability distribution for coding the symbols {0, 1} can be represented as a single value. This is so because having, for example, the probability p of coding the binary symbol 0, the probability of coding the binary symbol 1 can be determined as (1−p). As such, one probability value (or its fixed-point representation) can be used as input for looking up a value in the lookup table.

In the case of non-binary alphabets, the lookup table can be a multi-dimensional lookup table. For example, given a non-binary alphabet of 12 symbols, 11 inputs are required for the lookup in the lookup table.

In some implementations, such a complex (i.e., multi-dimensional) lookup table can be avoided by converting the probability distributions associated with the non-binary alphabet symbols into binary distributions. The binary distributions can be represented as a binary tree. The converting of the probability distributions of the non-binary alphabet into binary trees can be implicit or explicit. For example, assuming that the non-binary alphabet is a ternary alphabet (a, b, c) and that the non-binary probability distribution is given by a three-tuple (p_a, p_b, p_c), where p_a, p_b, and p_c are positive real numbers, where p_a+p_b+p_c=1, and where p_a, p_b, and p_c correspond respectively to the probability of symbol a, symbol b, and symbol c. In an example of converting the probability distribution (p_a, p_b, p_c) into binary distributions, the symbols b and c can be combined into as a single symbol bc. As such, a first binary distribution (p_a, p_b+p_c) for (a, bc) is obtained. To further determine the symbol b or the symbol c from the combined symbol bc, a second binary distribution (p_b/(p_b+p_c), p_c/(p_b+p_c)) can be obtained. For any distribution defined on a non-binary alphabet, the above conversion can be applied repeatedly (or recursively) to obtain an equivalent sequence of binary distributions.

Any binary tree can be used. Using FIG. 7 as an example, assuming that the probability distribution of coding the tokens 702-704, given a context, is known, a binary tree, such as the coefficient token tree 700, can be derived such that each internal node of the tree corresponds to a binary decision (i.e., each internal node corresponds to a binary probability distribution).

The binary distributions of the internal nodes of the derived tree can be used as inputs to the lookup table to determine a codeword length. For example, to estimate the cost of coding a token of the non-binary alphabet, the tree can be traversed up from the token to the root. The probabilities encountered in the traversal (i.e., the probabilities of the internal nodes) can be summed (i.e., added) and the sum can be used as the input into the lookup table.

In some implementations, the lookup table can be computed offline and can be available to the codec when encoding and/or decoding. In some implementation, the lookup table can be computed online. That is, the lookup table can be computed by a codec while coding. In some implementations, the lookup table can be periodically computed (e.g., updated, recomputed, etc.). In some implementations, the lookup table is recomputed if the alphabet size (i.e., the number of symbols in the alphabet) does not exceed a threshold number of symbols. The threshold number of symbols can be 12, 16, or any other threshold number.

Periodically computing the lookup table can mean computing the lookup table at the beginning of a coding unit, a super block, a transform block, or some other unit of a frame of video, that estimates the cost of coding each symbol in the alphabet.

In equations 9-13, only differences in codeword lengths are used. For example, the different $l_1(x^{i-1})-l_2(x^{i-1})$ is used in equation 10. As such, it may not be necessary to maintain (e.g., keep track of) the set of codeword lengths values $\{l_k\}$ for all models k. As such, in some implementations of 910 of FIGS. 9-10, storage requirements can be reduced by maintaining only codeword lengths differences. If K models are used, then differences associated with K−1 models are maintained. For example, in cases where two models, k∈{1, 2}, are used, only $l_1-l_2$ are used (e.g., required) for the purpose of mixing. Additionally, if probabilities have fixed-point representations, then the length differences $l_1-l_2$ can be stored in finite-precision to reduce storage complexity.

In an example, where K (>2) models are used, storage complexity associated with codeword lengths $\{l_k\}$ can be reduced using the following steps:
1. Select a model index j to be an arbitrary model index, fixed number between 1 and K, where K is the number of models to be mixed (i.e., 1≤j≤K).
2. Compute and store length differences $l_k-l_j$ for all 1≤k≤K excluding j.

In another implementation, in the first step, j can be selected such that $l_k \geq l_j$ for all 1≤k≤K. That is, only non-negative differences are stored (i.e., $l_k-l_j \geq 0$). The index j, which is the index within $\{l_k\}$ that holds the minimum value, may be maintained and/or updated since the index that holds the minimum value in $\{l_k\}$ may change. By storing only positive length differences, additional storage for storing sign bits (i.e., associated with negative values) can be saved (i.e., not used).

Figure 13:
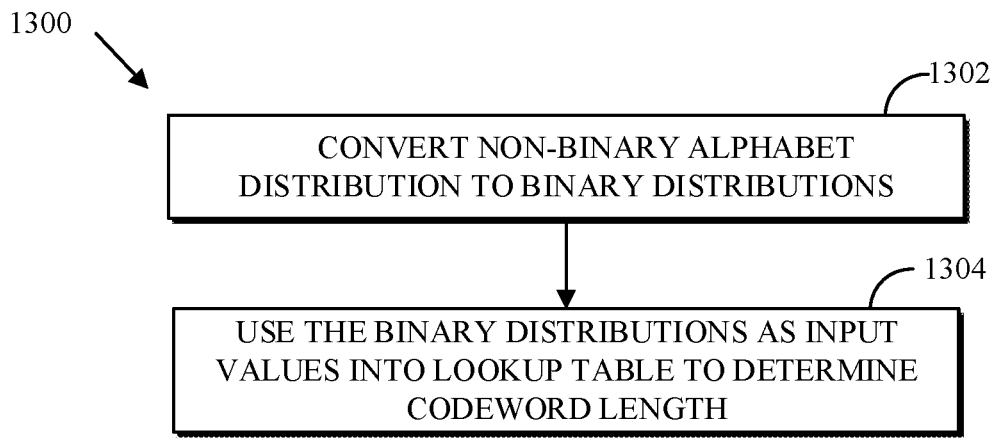
FIG. 13 is a flowchart diagram of a process for estimating a cost of coding a symbol in a non-binary alphabet according to an implementation of this disclosure.

FIG. 13 is a flowchart diagram of a process 1300 for estimating a cost of coding a symbol in a non-binary alphabet according to an implementation of this disclosure.

At 1302, the process 1300 converts a probability distribution associated with the alphabet (i.e., the probability values associated with each symbol of the non-binary alphabet) into binary distributions. In an example, the probability mass function (PMF) can be converted into the binary distributions. In another example, the cumulative distribution function (CDF) of the probability distribution can be converted into the binary distributions. As mentioned above, the binary distributions are generated either implicitly or explicitly by using a full binary tree.

At 1304, the process 1300 uses the binary distributions to estimate (i.e., look up) the codeword length in bits (or their scaled version). The block 1304 can be used by the process 900 at 906. The block 1304 can be used by the process 1000 at 906.

In the case where more than two (2) models are mixed, a binary tree can be used to compute (i.e., determine, generate, etc.) the conditional probabilities. That is, the factors $w_{i,k}p_k(x_i|x^{i-1})$ of equation (8) can be recursively computed using the above-described processes. Recursively computing means combining the probabilities of two (2) models at a time to produce intermediate conditional probabilities. The intermediate conditional probabilities are then combined, two at a time. In the case where the number of models M is a power of 2 (i.e., $M=2^m$), the factors $w_{i,k}p_k(x_i|x^{i-1})$ of equation (8) can be recursively computed by applying the above described processes on a full binary tree such as described with respect to FIG. 11.

Figure 11:
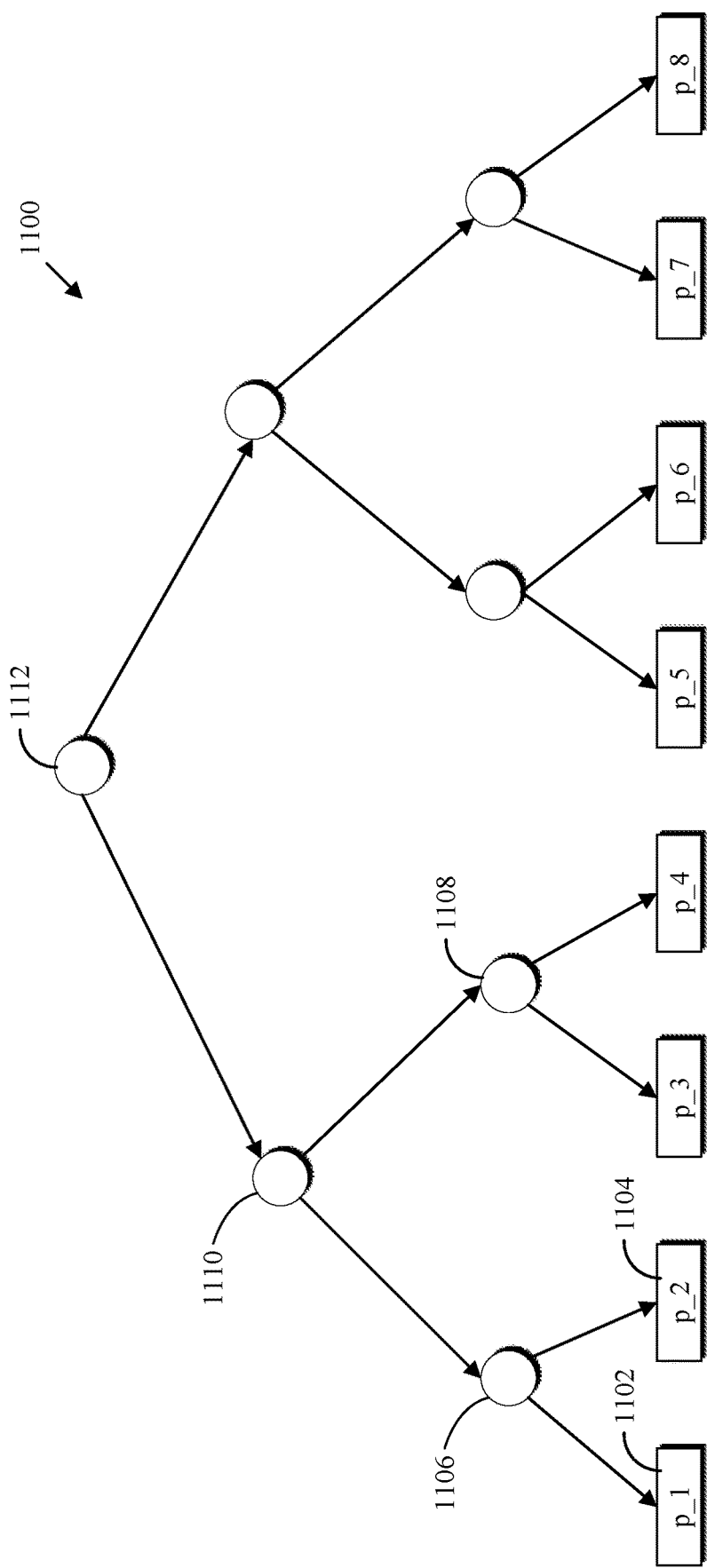
FIG. 11 is a diagram of an example of a binary tree of conditional probabilities according to an implementation of this disclosure.

FIG. 11 is a diagram of an example of a binary tree 1100 of conditional probabilities according to an implementation of this disclosure. In the binary tree 1100, eight (8) models are mixed. The probabilities of the eight models are p_1 to p_8. Every two probabilities are first mixed. For example, the probabilities 1102 and 1104 are mixed as described above to generate intermediate conditional probability 1106, which is then combined with the intermediate conditional probability 1108 to produce intermediate conditional probability 1110, and so on until a final conditional probability 1112 is computed. The final conditional probability 1112 can be used for encoding and/or decoding. For example, the final conditional probability 1112 can be used at 908 of the process 900 and/or at 1002 of the process 1000.

The process described with respect to FIG. 11 can be used in situations where, for example, some models are known to be more useful than other models. In the case where some models are known to be more useful than others, uniform weighting may be undesirable. In order to assign more weight to one model, the model can be replicated in the tree.

Referring to FIG. 11 as an example, the models p_1, p_2, . . . , p_6 and p_8 may be distinct and p_6 is known to be more useful than the other models. As p_6 is more useful, p_6 can be replicated in the tree: p_7 is a duplicate of p_6. As such, the model with probability p_6 is assigned twice the weight in the mixing for entropy encoding.

As another example, suppose, for example, there are two models, model A and model B, and the prior weights for the two models are $$\left(\frac{1}{4}, \frac{3}{4}\right).$$

Implementations according to this disclosure, can expand the model set to a set of 4 models, where the first model corresponds to the model A, the remaining three models correspond to the model B, and the prior for the four models is $$\left(\frac{1}{4}, \frac{1}{4}, \frac{1}{4}, \frac{1}{4}\right).$$

In the foregoing, stationary sources are described. A stationary source means that the mixing for the symbol $x_i$ uses all the history of the sub-sequence $x^{i-1}$ to determine $w_{i,k}$. As such, the statistics do not change over the source of the coding process. However, in the cases where the sources may be non-stationary, implementations according this this disclosure can adapt to the local statistics for better compression performance using a sliding window. The sliding window as length L of bits indicating the number of previous bits (i.e., the probabilities of the number of the previous bits) to be used in the mixing process. That is, the sliding window represents how far back into the sequence to remember: only symbols inside the sliding window are used to estimate the weighting factors. More specifically, only the probabilities of those symbols inside the sliding window are used to estimate the weighting factors.

As such, instead of using $\tilde{p}(x_i|x^{i-1})$ to code $x_i$, $\tilde{p}(x_i|x_{i-L} \cdots x_{i-1})$ where the length $L \geq 1$ is the length of the sliding window and where $x_{i-L} \cdots x_{j-1}$ is the sub-sequence starting at bit i-L and ending at bit i-1. When the length L is known, a process according to this disclosure can perform the following steps for two models:

At step 1, initialize i=1, $l_1=0$, $l_2=0$. The step 1 can be as described with respect to 902 of FIG. 9. At step 1, the process also initializes $l_{1,-L}=0$, and $l_{2,-L}=0$.

At step 2, the process computes $p_1(x_i|x_{i-L} \cdots x_{i-1})$ and $p_2(x_i|x_{i-L} \cdots x_{i-1})$ according to the first model and the second model.

At step 3, the process computes the mixed probability $\tilde{p}(x_i|x_{i-L} \cdots x_{i-1})$ according to the equations 15 and 16:

$$\tilde{p}(x_i|x_{i-L} \ldots x_{i-1}) = \qquad (15)$$
$$w_{i,1} p_1(x_i|x_{i-L} \ldots x_{i-1}) + w_{i,2} p_2(x_i|x_{i-L} \ldots x_{i-1})$$

$$w_{i,k} \approx \frac{2^{-l_1(x^{i-1})+l_1(x^{i-L-1})}}{\sum_{j=1}^{2} 2^{-l_j(x^{i-1})+l_j(x^{i-L-1})}}, k=1,2 \qquad (16)$$

At step 4, the process encodes (when implemented by an encoder) or decodes (when implemented by a decoder) $x_i$ by using $\tilde{p}(x_i|x_{i-L} \cdots x_{i-1})$.

At step 5, the process updates $l_1$ to $l_1=l_1-\log p_1(x_i|x_{i-L} \cdots x_{i-1})$ and updates $l_2$ to $l_2=l_2-\log p_2(x_i|x_{i-L} \cdots x_{i-1})$. If the process is encoding/decoding outside the window (i.e., i>L), then the process updates $l_{1,-L}=\log p_1(x_{i-L}|x_{i-2L} \cdots x_{i-L-1})$ and $l_{2,-L}=l_{2,-L}-\log p_2(x_{i-L}|x_{i-2L} \cdots x_{i-L-1})$.

At step 6, i is increased by 1 (i.e., i=i+1).

At step 7, the process repeats the steps 2-6 until all the bits of the sequence $x^n$ are processed (i.e., i=n+1).

In the sliding window described above, $l_1(x^{i-1})-l_1(x^{i-L-1})=l_1-l_{1,-L}$ and $l_2(x^{i-1})-l_2(x^{i-L-1})=l_2-l_{2,-L}$. As such, $l_1(x^{i-1})-l_1(x^{i-L-1})$ can be regarded as the codeword length produced by using the first model to code $x_{i-L} \ldots x_{i-1}$ and $l_2(x^{i-1})-l_2(x^{i-L-1})$ can be regarded as the codeword length produced by using the second model to code $x_{i-L} \ldots x_{i-1}$.

In the case of local mixing for a transform block, described above, when a new transform block starts (i.e., when the coding of a transform block starts), the codeword lengths $\{l_k\}$ can be reset for all models k so that all models can be equally considered at the beginning of coding the new (i.e., current) transform block. As such, when the coding of a current transform block is completed, the lengths $l_k$ are reset to zero for the coding of the next transform block.

In some implementations, local mixing can be applied to other coding units. For example, the lengths $l_k$ can be reset at the start of a coding unit other than the transform block. For example, the coding unit can be a super block (e.g., a block of size 64×64). As such, lengths $l_k$ can be reset at the start of a super block. The lengths $l_k$ can be reset at the start coding units of other sizes (e.g., 128×128).

In the case of a sliding window described above, the memory step (i.e., the length L) is fixed. In the case of local mixing, the memory step is adapted to the transform block size. For example, a first transform block may be a 4×4 transform block, a second transform block may be 16×16, and so on. As such, the lengths $l_k$ are reset after different number of coefficients are coded, depending on the block size and/or the location of the last non-zero coefficient in the quantized transform block.

Figure 12:
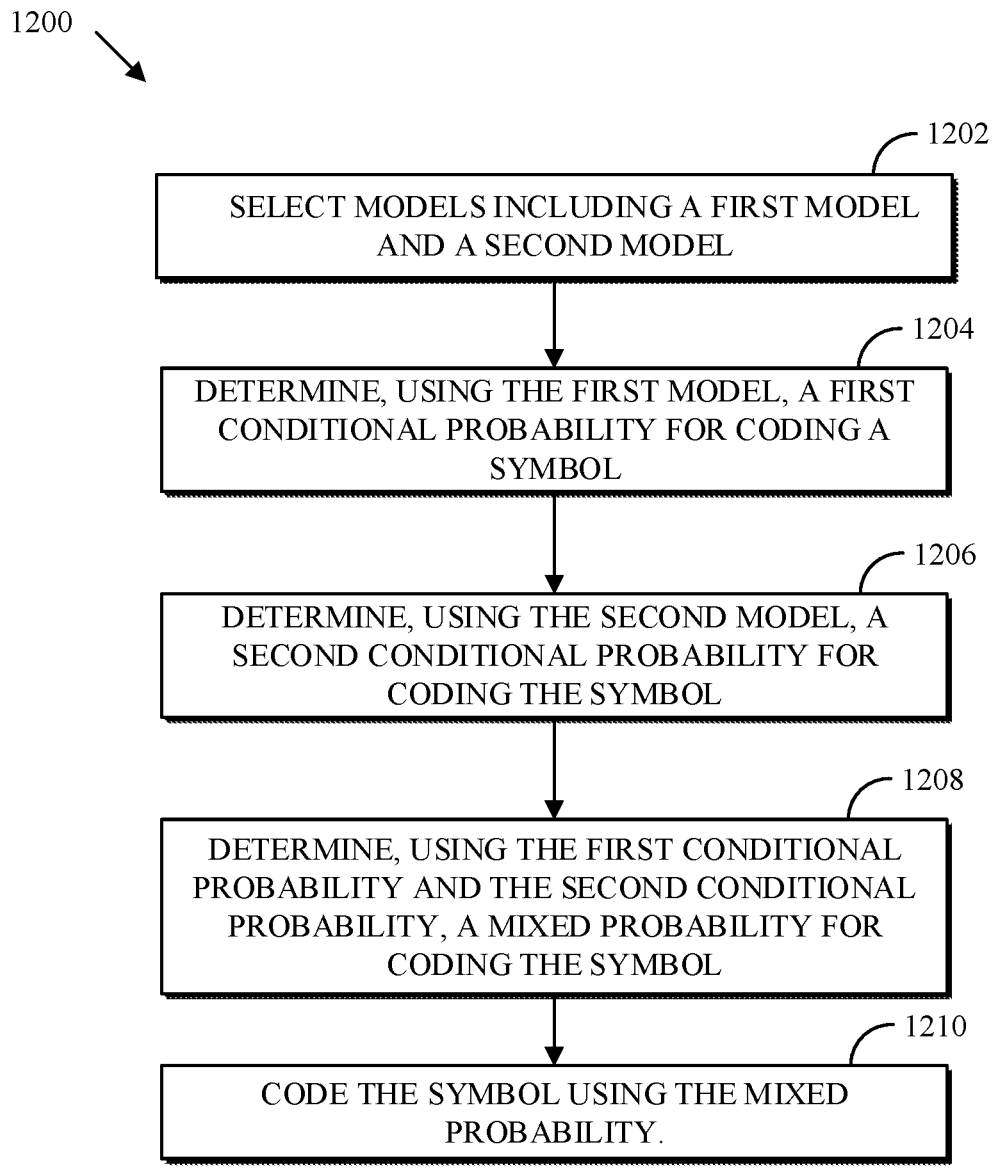
FIG. 12 is a flowchart diagram of a process for entropy coding according to an implementation of this disclosure.

FIG. 12 is a flowchart diagram of a process 1200 for entropy coding a sequence of symbols according to an implementation of this disclosure. The sequence can be as described above for sequences $x^n$. The process 1200 can be implemented by an encoder or a decoder. When implemented by an encoder, "coding" means encoding in an encoded bitstream, such as the compressed bitstream 420 of FIG. 4. When implemented by a decoder, "coding" means decoding from an encoded bitstream, such as the compressed bitstream 420 of FIG. 5.

When implemented by an encoder, the process 1200 can receive the sequence of symbols from a quantization step, such as the quantization stage 406 of FIG. 4. In another example, the process 1200 can receive a value to be encoded (e.g., a quantized transform coefficient) and generates the sequence of symbols from the received value. When implemented by a decoder, the decoder can receive the sequence of symbols in an encoded bitstream, such as the compressed bitstream 420 of FIG. 5.

At 1202, the process 1200 selects models to be mixed. The models can include a first model and a second model. As used in this disclosure, "select" means to identify, construct, determine, specify or other select in any manner whatsoever.

For at least a symbol (e.g., $x_i$), at a position (e.g., i) of the symbols, the process 1200 performs blocks including the blocks 1204-1208 to determine a mixed probability using the first model and the second model. The blocks 1204-1208 can be performed for all symbols of the sequence of symbols.

At 1204, the process 1200 determines, using the first model, a first conditional probability for coding the symbol. The first conditional probability is the conditional probability of the symbol given a sub-sequence of the sequence. In an example, the sub-sequence of the sequence can mean the sub-sequence $x^{i-1}$. In another example, wherein a sliding window is being used, the sub-sequence of the sequence consists of a predetermined number of symbols of the sequence before the position. The predetermined number of symbols can be as described with respect to the sliding window length L. As such the sub-sequence of the sequence can be the sub-sequence $x_{i-L} \cdots x_{i-1}$. At 1206, the process 1200 determines, using the second model, a second conditional probability for coding the symbol. The second conditional probability is a conditional probability of the symbol given the sub-sequence as described with respect to the block 1204.

At 1208, the process 1200 determines, using the first conditional probability and the second conditional probability, a mixed probability for coding the symbol. The mixed probability can be as described with respect to 906 of FIG.

9. The first conditional probability and the second conditional probability can be combined using a linear combination that uses a first weight and a second weight. In an implementation, at least the first weight can be determined (i.e., approximated) using a hypothetical arithmetic coding to determine a length for coding a sub-sequence of the sequence up to the symbol. The first weight can be determined using the length. In an example, determining a weight (e.g., the first weight and/or the second weight) can include determining a rate resulting from coding a sub-sequence of the sequence up to the symbol and determining the first weight using the determined rate. In an example, the rate can be determined using a rate estimator. In an example, the rate estimator can be a hypothetical arithmetic encoder. In an example, determining the rate can include looking up a table (e.g., a lookup table) with inputs as probability values. That is, the probability values are used as inputs into the lookup table.

At 1210, the process 1200 codes the symbol using the mixed probability as described, for example, with respect to the 908 (when implemented by an encoder) and 1002 (when implemented by a decoder).

In an implementation of the process 1200, the models can include a third model and a fourth model and determining the mixed probability using the first model and the second model can include mixing the first model and the second model to generate a first intermediate conditional probability, mixing the third model and the fourth model to generate a second intermediate conditional probability, and mixing the first intermediate conditional probability and the second intermediate conditional probability to generate a conditional probability to be used for coding the symbol. In an implementation, the first model and the fourth model are a same model.

Figure 14:
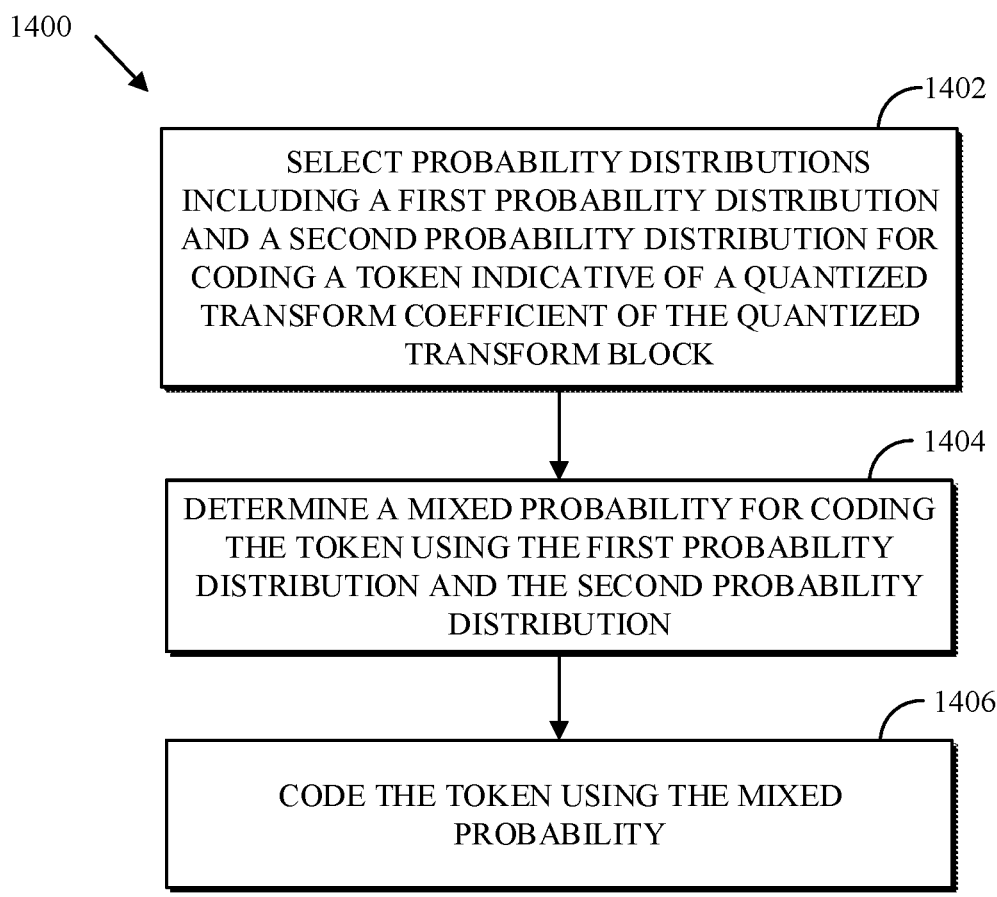
FIG. 14 is a flowchart diagram of a process for entropy coding a quantized transform block according to an implementation of this disclosure.

FIG. 14 is a flowchart diagram of a process 1400 for entropy coding a quantized transform block according to an implementation of this disclosure. The process 1400 codes tokens indicative of the quantized transform coefficients of the quantized transform block. The tokens can be selected from a non-binary alphabet of tokens as described above. The process 1400 codes a transform coefficient as described above with respect to local mixing for a transform block. In an implementation, the process 1400 can be repeated for tokens corresponding of the quantized transform block up to the end-of-block token.

The process 1400 can be implemented by an encoder or a decoder. When implemented by an encoder, "coding" means encoding in an encoded bitstream, such as the compressed bitstream 420 of FIG. 4. When implemented by a decoder, "coding" means decoding from an encoded bitstream, such as the compressed bitstream 420 of FIG. 5.

When implemented by an encoder, the process 1400 can receive the quantized transform block from a quantization step, such as the quantization stage 406 of FIG. 4, and can be implemented, in part or in whole, by an entropy coding step, such as the entropy encoding stage 408. When implemented by a decoder, the decoder can receive quantized transform block in an encoded bitstream, such as the compressed bitstream 420 of FIG. 5, and can be implemented, in part or in whole, by an entropy decoding step, such as the entropy decoding stage 502.

At 1402, the process 1400 selects probability distributions for coding a token indicative of a quantized transform coefficient of the quantized transform block. Two or more probability distributions can be selected. In an example, the probability distributions include a first probability distribution and a second probability distribution. Each of the probability distributions provides probability values (e.g., first probability values and second probability values) corresponding to the tokens of the alphabet. For example, if the non-binary alphabet includes N (e.g., 16) symbols, then the probability distribution can include N probability values.

At 1404, the process 1400 determines a mixed probability for coding the token using the first probability distribution and the second probability distribution. The mixed probability can be determined as described above with respect to FIGS. 9-10. Determining the mixed probability can include determining, using the first probability distribution, a first conditional probability for coding the token, determining, using the second probability distribution, a second conditional probability for coding the token, and determining the mixed probability using the first conditional probability and the second conditional probability. The first conditional probability can be a conditional probability of the token given previously coded tokens for the quantized transform block. The second conditional probability can be a conditional probability of the token given previously coded tokens for the quantized transform block.

In an implementation, determining the mixed probability can also include combining the first conditional probability and the second conditional probability using a linear combination that uses a first weight and a second weight. The first weight can be based on a first length of a first codeword for coding tokens corresponding to the previously coded tokens using the first conditional probability. The second weight can be based on a second length of a second codeword for coding tokens corresponding to the previously coded tokens using the second conditional probability.

In an implementation, the first weight and the second weight can be determined by converting the first probability distribution to a first binary distribution, converting the second probability distribution to a second binary distribution, determining the first length using the first binary distribution, and determining the second length using the second binary distribution.

In an implementation, the first probability distribution can be an initial probability distribution for coding the quantized transform coefficients of the quantized transform block. That is, the first probability distribution can be a probability distribution that is selected based on a context for coding the quantized transform coefficient. In an implementation, and when implemented by a decoder, the initial probability can be decoded from the encoded bitstream.

The second probability distribution can be based on statistics of a coding unit. As such, the second probability distribution can be modified (e.g., updated) as quantized coefficients are coded to reflect the actual statistics of the coding unit. The coding unit can be the quantized transform block. The coding unit can be a super block that includes the quantized transform block.

At 1406, the process 1400 codes the token using the mixed probability.

For simplicity of explanation, the processes 900, 1000, 1200, 1300, and 1400 are each depicted and described as a series of blocks, steps, or operations. However, the blocks, steps, or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

A technique known as context-tree weighting (CTW) is a lossless data compression algorithm that uses mixing. To code a binary sequence $x^n$ of length n, CTW estimates a probability function p($x^n$) as a linear mixture of $2^K$ (probability functions p$_i$($x^n$)), each of which is estimated by assuming a finite memory binary tree source and has the same weighting factor. Contrastingly, implementations according to this disclosure can work with any models. Furthermore, the symbol-by-symbol weighting factor computation described herein can use length functions to approximate probabilities of sub-sequences, which is much simplified in comparison to existing solutions that maintain and compute joint probabilities.

The aspects of encoding and decoding described above illustrate some encoding and decoding techniques. However, it is to be understood that encoding and decoding, as those terms are used in the claims, could mean compression, decompression, transformation, or any other processing or change of data.

The words "example" or "implementation" are used herein to mean serving as an example, instance, or illustration. Any aspect or design described herein as "example" or "implementation" is not necessarily to be construed as preferred or advantageous over other aspects or designs. Rather, use of the words "example" or "implementation" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 102 and/or receiving station 106 (and the algorithms, methods, instructions, etc., stored thereon and/or executed thereby, including by encoder 400 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 102 and receiving station 106 do not necessarily have to be implemented in the same manner.

Further, in one aspect, for example, transmitting station 102 or receiving station 106 can be implemented using a general purpose computer or general purpose processor with a computer program that, when executed, carries out any of the respective methods, algorithms and/or instructions described herein. In addition, or alternatively, for example, a special purpose computer/processor can be utilized which can contain other hardware for carrying out any of the methods, algorithms, or instructions described herein.

Transmitting station 102 and receiving station 106 can, for example, be implemented on computers in a video conferencing system. Alternatively, transmitting station 102 can be implemented on a server and receiving station 106 can be implemented on a device separate from the server, such as a hand-held communications device. In this instance, transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 102. Other transmitting station 102 and receiving station 106 implementation schemes are available. For example, receiving station 106 can be a generally stationary personal computer rather than a portable communications device and/or a device including an encoder 400 may also include a decoder 500.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. An apparatus for entropy coding a sequence of bits, the apparatus:
    obtains, using a first probability distribution, a first conditional probability for coding a bit at a position within the sequence of bits, the first conditional probability being a conditional probability of the bit having a certain value given that a sub-sequence of the sequence of bits has first respective values;
    obtains, using a second probability distribution that is different from the first probability distribution, a second conditional probability for coding the bit, the second conditional probability being a conditional probability of the bit having the certain value given that the sub-sequence has second respective values;
    determines a rate resulting from entropy coding the sub-sequence up to but excluding the bit;
    determines a weight using the determined rate;
    obtains a mixed conditional probability for coding the bit as a weighted combination of the first conditional probability and the second conditional probability, wherein the weight is used in the weighted combination; and
    codes the bit using the mixed probability.

2. The apparatus of claim 1, wherein the apparatus further:
    updates at least one of the first conditional probability or the second conditional probability after coding the bit using the mixed probability.

3. The apparatus of claim 1, wherein to determine the rate comprises to:
    look up the rate in a lookup table that uses probability values as inputs.

4. The apparatus of claim 1,
wherein to obtain the first conditional probability comprises to:
look up the first conditional probability in a lookup table; and
wherein to obtain the second conditional probability comprises to:
look up the second conditional probability in the lookup table.

5. The apparatus of claim 1, wherein to obtain the mixed probability comprises to:
mix the first probability distribution and the second probability distribution to generate a first intermediate conditional probability;
mix a third probability distribution and a fourth probability distribution to generate a second intermediate conditional probability; and
mix the first intermediate conditional probability and the second intermediate conditional probability to generate the mixed probability for coding the bit.

6. The apparatus of claim 5, wherein the fourth probability distribution is a same probability distribution as the first probability distribution.

7. The apparatus of claim 1, wherein the sub-sequence includes all bits of the sequence of bits up to but excluding the position.

8. The apparatus of claim 1, wherein the sub-sequence consists of a less than all bits of the sequence of bits before the position.

9. A method for entropy coding a quantized transform block, comprising:
selecting probability distributions comprising a first probability distribution and a second probability distribution for coding a token indicative of a quantized transform coefficient of the quantized transform block;
approximating, using the first probability distribution, a first conditional probability for coding the token, the first conditional probability being a conditional probability of the token given previously coded tokens for the quantized transform block;
approximating, using the second probability distribution, a second conditional probability for coding the token, the second conditional probability being a conditional probability of the token given the previously coded tokens for the quantized transform block;
obtaining a mixed probability as a weighted linear combination of the first conditional probability and the second conditional probability, wherein the weighted linear combination uses a first weight and a second weight, wherein
the first weight is based on a first length of a first codeword for coding tokens corresponding to the previously coded tokens using the first conditional probability, and
the second weight is based on a second length of a second codeword for coding tokens corresponding to the previously coded tokens using the second conditional probability; and
coding the token using the mixed probability.

10. The method of claim 9, wherein the token is selected from an alphabet of tokens, the first probability distribution comprises first probability values for the tokens of the alphabet of tokens, and the second probability distribution comprises second probability values for the tokens of the alphabet of tokens.

11. The method of claim 9, further comprising:
determining the first length and the second length by:
converting the first probability distribution to a first binary distribution;
converting the second probability distribution to a second binary distribution;
determining the first length using the first binary distribution; and
determining the second length using the second binary distribution.

12. The method of claim 9, wherein
the first probability distribution is an initial probability distribution for coding the quantized transform coefficients of the quantized transform block, and
the second probability distribution is based on statistics of a coding unit.

13. The method of claim 12, wherein the coding unit is the quantized transform block.

14. The method of claim 9,
wherein approximating the first conditional probability comprises:
looking up the first conditional probability in a first lookup table; and
wherein approximating the second conditional probability comprises:
looking up the second conditional probability in a second lookup table.

15. An apparatus for entropy decoding a sequence of symbols, comprising:
a processor configured to:
select models comprising a first model and a second model for decoding a sequence of bits $x^n$, wherein the sequence of bits $x^n$ comprises bits $x_i$ for each i=0 to n-1; and
for each bit $x_j$ at a position j of the sequence of bits $x^n$, the processor is configured to:
determine a first conditional probability $p_1(x_i|x^{j-1})$ using the first model;
determine a second conditional probability $p_2(x_i|x^{j-1})$ using the second model;
obtain a mixed probability $\tilde{p}(x_i|x^{j-1})$ as a weighted combination of the first conditional probability and the second conditional probability using a first weight that corresponds to a first length $l_1$ of a codeword resulting from using the first model for decoding a sub-sequence $x^{j-1}$; and
decode the bit $x_j$ using the mixed probability.

16. The apparatus of claim 15,
wherein the first conditional probability is a first conditional probability using the first model of the bit $x_j$ having a certain value given that the sub-sequence $x^{j-1}$ of the sequence of bits having a first value, and
wherein the second conditional probability being a second conditional probability using the second model of the symbol $x_j$ having the certain value given that the sub-sequence $x^{j-1}$ of the sequence of bits having the first value.

17. The apparatus of claim 16,
wherein the weighted combination uses a second weight that corresponds to a second length $l_2$ of the codeword resulting from using the second model for decoding the sub-sequence $x^{j-1}$.

18. The apparatus of claim 17, wherein at least one of the first conditional probability or the second conditional probability is approximated using a lookup table.

* * * * *